(12) United States Patent
Reiss et al.

(10) Patent No.: US 7,337,019 B2
(45) Date of Patent: *Feb. 26, 2008

(54) INTEGRATION OF FAULT DETECTION WITH RUN-TO-RUN CONTROL

(75) Inventors: Terry P. Reiss, San Jose, CA (US); Arulkumar P. Shanmugasundram, Sunnyvale, CA (US); Alexander T. Schwarm, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 10/135,405

(22) Filed: May 1, 2002

(65) Prior Publication Data

US 2003/0014145 A1 Jan. 16, 2003

Related U.S. Application Data

(60) Provisional application No. 60/305,140, filed on Jul. 16, 2001.

(51) Int. Cl.
*G06F 19/00* (2006.01)
*H05B 1/02* (2006.01)
*G05B 11/01* (2006.01)

(52) U.S. Cl. ................ 700/21; 700/121; 700/117; 700/123; 219/497; 219/490; 219/495

(58) Field of Classification Search .......... 700/51, 700/117–123, 108, 110, 21; 714/47, 48; 438/5, 7–10, 12, 14, 16; 219/490–497
See application file for complete search history.

(56) References Cited

U.S. PATENT DOCUMENTS 3,205,485 A   9/1965 Noltingk
3,229,198 A   1/1966 Libby
3,767,900 A   10/1973 Chao et al.

(Continued)

FOREIGN PATENT DOCUMENTS

CA   2050247   8/1991

(Continued)

OTHER PUBLICATIONS

"A real-time equipment monitoring and fault detection system", Guo et al., Semiconductor Manufacturing Technology Workshop, Jun. 16-17, 1998, pp. 111-121.*

(Continued)

*Primary Examiner*—Anthony Knight
*Assistant Examiner*—Sunray Chang
(74) *Attorney, Agent, or Firm*—Blakely Sokoloff Taylor & Zafman

(57) ABSTRACT

Semiconductor wafers are processed in conjunction with a manufacturing execution system using a run-to-run controller and a fault detection system. A recipe is received from the manufacturing execution system by the run-to-run controller for controlling a tool. The recipe includes a setpoint for obtaining one or more target wafer properties. Processing of the wafers is monitored by measuring processing attributes including fault conditions and wafer properties using the fault detection system and one or more sensors. Setpoints of the recipe may be modified at the run-to-run controller according to the processing attributes to maintain the target wafer properties, except in cases when a fault condition is detected by the fault detection system. Thus, data acquired in the presence of tool or wafer fault conditions are not used for feedback purposes. In addition, fault detection models may be used to define a range of conditions indicative of a fault condition. In these cases, the fault detection models may be modified to incorporate, as parameters, setpoints of a recipe modified by a run-to-run controller.

75 Claims, 7 Drawing Sheets

U.S. PATENT DOCUMENTS

| | | |
|---|---|---|
| 3,920,965 A | 11/1975 | Sohrwardy |
| 4,000,458 A | 12/1976 | Miller et al. |
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,796,194 A | 1/1989 | Atherton |
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 5,089,970 A | 2/1992 | Lee et al. |
| 5,108,570 A | 4/1992 | Wang |
| 5,208,765 A | 5/1993 | Turnbull |
| 5,220,517 A | 6/1993 | Sierk et al. |
| 5,226,118 A | 7/1993 | Baker et al. |
| 5,231,585 A | 7/1993 | Kobayashi et al. |
| 5,236,868 A | 8/1993 | Nulman |
| 5,240,552 A | 8/1993 | Yu et al. |
| 5,260,868 A | 11/1993 | Gupta et al. |
| 5,270,222 A | 12/1993 | Moslehi |
| 5,283,141 A | 2/1994 | Yoon et al. |
| 5,295,242 A | 3/1994 | Mashruwala et al. |
| 5,309,221 A | 5/1994 | Fischer et al. |
| 5,329,463 A | 7/1994 | Sierk et al. |
| 5,338,630 A | 8/1994 | Yoon et al. |
| 5,347,446 A | 9/1994 | Iino et al. |
| 5,367,624 A | 11/1994 | Cooper |
| 5,369,544 A | 11/1994 | Mastrangelo |
| 5,375,064 A | 12/1994 | Bollinger |
| 5,398,336 A | 3/1995 | Tantry et al. |
| 5,402,367 A | 3/1995 | Sullivan et al. |
| 5,408,405 A | 4/1995 | Mozumder et al. |
| 5,410,473 A | 4/1995 | Kaneko et al. |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,571,366 A * | 11/1996 | Ishii et al. ............. 156/345.26 |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,698,989 A | 12/1997 | Nulman |
| 5,719,495 A | 2/1998 | Moslehi |
| 5,719,796 A | 2/1998 | Chen |
| 5,735,055 A | 4/1998 | Hochbein et al. |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,761,065 A | 6/1998 | Kittler et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A * | 1/1999 | Wang et al. .................. 714/48 |
| 5,859,975 A | 1/1999 | Brewer et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,883,437 A | 3/1999 | Maruyama et al. |
| 5,889,991 A | 3/1999 | Consolatti et al. |
| 5,895,596 A * | 4/1999 | Stoddard et al. ............ 219/497 |
| 5,901,313 A | 5/1999 | Wolf et al. |
| 5,903,455 A | 5/1999 | Sharpe, Jr. et al. |
| 5,910,011 A | 6/1999 | Cruse |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |
| 6,017,771 A | 1/2000 | Yang et al. |
| 6,036,349 A | 3/2000 | Gombar |

| | | | |
|---|---|---|---|
| 6,037,664 A | 3/2000 | Zhao et al. | |
| 6,041,263 A | 3/2000 | Boston et al. | |
| 6,041,270 A | 3/2000 | Steffan et al. | |
| 6,054,379 A | 4/2000 | Yau et al. | |
| 6,059,636 A | 5/2000 | Inaba et al. | |
| 6,064,759 A | 5/2000 | Buckley et al. | |
| 6,072,313 A | 6/2000 | Li et al. | |
| 6,074,443 A | 6/2000 | Venkatesh et al. | |
| 6,077,412 A | 6/2000 | Ting et al. | |
| 6,078,845 A | 6/2000 | Friedman | |
| 6,094,688 A | 7/2000 | Mellen-Garnett et al. | |
| 6,096,649 A | 8/2000 | Jang | |
| 6,097,887 A | 8/2000 | Hardikar et al. | |
| 6,100,195 A | 8/2000 | Chan et al. | |
| 6,108,092 A | 8/2000 | Sandhu | |
| 6,111,634 A | 8/2000 | Pecen et al. | |
| 6,112,130 A | 8/2000 | Fukuda et al. | |
| 6,113,462 A | 9/2000 | Yang | |
| 6,114,238 A | 9/2000 | Liao | |
| 6,127,263 A | 10/2000 | Parikh | |
| 6,128,016 A | 10/2000 | Coelho et al. | |
| 6,136,163 A | 10/2000 | Cheung et al. | |
| 6,141,660 A | 10/2000 | Bach et al. | |
| 6,143,646 A | 11/2000 | Wetzel | |
| 6,148,099 A | 11/2000 | Lee et al. | |
| 6,148,239 A | 11/2000 | Funk et al. | |
| 6,148,246 A | 11/2000 | Kawazome | |
| 6,150,270 A | 11/2000 | Matsuda et al. | |
| 6,157,864 A | 12/2000 | Schwenke et al. | |
| 6,159,075 A | 12/2000 | Zhang | |
| 6,159,644 A | 12/2000 | Satoh et al. | |
| 6,161,054 A | 12/2000 | Rosenthal et al. | |
| 6,169,931 B1 | 1/2001 | Runnels | |
| 6,172,756 B1 | 1/2001 | Chalmers et al. | |
| 6,173,240 B1 | 1/2001 | Sepulveda et al. | |
| 6,175,777 B1 | 1/2001 | Kim | |
| 6,178,390 B1 | 1/2001 | Jun | |
| 6,181,013 B1 | 1/2001 | Liu et al. | |
| 6,183,345 B1 | 2/2001 | Kamono et al. | |
| 6,185,324 B1 | 2/2001 | Ishihara et al. | |
| 6,191,864 B1 | 2/2001 | Sandhu | |
| 6,192,291 B1 | 2/2001 | Kwon | |
| 6,197,604 B1 | 3/2001 | Miller et al. | |
| 6,204,165 B1 | 3/2001 | Ghoshal | |
| 6,207,937 B1 * | 3/2001 | Stoddard et al. | 219/497 |
| 6,210,983 B1 | 4/2001 | Atchison et al. | |
| 6,211,094 B1 | 4/2001 | Jun et al. | |
| 6,211,495 B1 * | 4/2001 | Stoddard et al. | 219/497 |
| 6,212,961 B1 | 4/2001 | Dvir | |
| 6,214,734 B1 | 4/2001 | Bothra et al. | |
| 6,217,412 B1 | 4/2001 | Campbell et al. | |
| 6,219,711 B1 | 4/2001 | Chari | |
| 6,222,164 B1 * | 4/2001 | Stoddard et al. | 219/497 |
| 6,222,936 B1 | 4/2001 | Phan et al. | |
| 6,226,563 B1 | 5/2001 | Lim | |
| 6,226,792 B1 | 5/2001 | Goiffon et al. | |
| 6,228,280 B1 | 5/2001 | Li et al. | |
| 6,230,069 B1 * | 5/2001 | Campbell et al. | 700/121 |
| 6,236,903 B1 | 5/2001 | Kim et al. | |
| 6,237,050 B1 | 5/2001 | Kim et al. | |
| 6,240,330 B1 | 5/2001 | Kurtzberg et al. | |
| 6,240,331 B1 | 5/2001 | Yun | |
| 6,245,581 B1 | 6/2001 | Bonser et al. | |
| 6,246,972 B1 | 6/2001 | Klimasauskas | |
| 6,248,602 B1 | 6/2001 | Bode et al. | |
| 6,249,712 B1 | 6/2001 | Boiquaye | |
| 6,252,412 B1 | 6/2001 | Talbot et al. | |
| 6,253,366 B1 | 6/2001 | Mutschler, III | |
| 6,259,160 B1 | 7/2001 | Lopatin et al. | |
| 6,263,255 B1 | 7/2001 | Tan et al. | |
| 6,268,270 B1 * | 7/2001 | Scheid et al. | 438/522 |
| 6,271,670 B1 | 8/2001 | Caffey | |
| 6,276,989 B1 | 8/2001 | Campbell et al. | |
| 6,277,014 B1 | 8/2001 | Chen et al. | |
| 6,278,899 B1 | 8/2001 | Piche et al. | |
| 6,280,289 B1 | 8/2001 | Wiswesser et al. | |
| 6,281,127 B1 | 8/2001 | Shue | |
| 6,284,622 B1 | 9/2001 | Campbell et al. | |
| 6,287,879 B1 | 9/2001 | Gonzales et al. | |
| 6,290,572 B1 | 9/2001 | Hofmann | |
| 6,291,367 B1 | 9/2001 | Kelkar | |
| 6,292,708 B1 | 9/2001 | Allen et al. | |
| 6,298,274 B1 | 10/2001 | Inoue | |
| 6,298,470 B1 | 10/2001 | Breiner et al. | |
| 6,303,395 B1 | 10/2001 | Nulman | |
| 6,304,999 B1 | 10/2001 | Toprac et al. | |
| 6,307,628 B1 | 10/2001 | Lu et al. | |
| 6,314,379 B1 | 11/2001 | Hu et al. | |
| 6,317,643 B1 | 11/2001 | Dmochowski | |
| 6,320,655 B1 | 11/2001 | Matsushita et al. | |
| 6,324,481 B1 | 11/2001 | Atchison et al. | |
| 6,334,807 B1 | 1/2002 | Lebel et al. | |
| 6,336,841 B1 | 1/2002 | Chang | |
| 6,339,727 B1 | 1/2002 | Ladd | |
| 6,340,602 B1 | 1/2002 | Johnson et al. | |
| 6,345,288 B1 | 2/2002 | Reed et al. | |
| 6,345,315 B1 | 2/2002 | Mishra | |
| 6,346,426 B1 | 2/2002 | Toprac et al. | |
| 6,355,559 B1 | 3/2002 | Havemann et al. | |
| 6,360,133 B1 | 3/2002 | Campbell et al. | |
| 6,360,184 B1 | 3/2002 | Jacquez | |
| 6,363,294 B1 | 3/2002 | Coronel et al. | |
| 6,366,934 B1 | 4/2002 | Cheng et al. | |
| 6,368,879 B1 | 4/2002 | Toprac | |
| 6,368,883 B1 | 4/2002 | Bode et al. | |
| 6,368,884 B1 | 4/2002 | Goodwin et al. | |
| 6,379,980 B1 | 4/2002 | Toprac | |
| 6,381,564 B1 | 4/2002 | Davis et al. | |
| 6,388,253 B1 | 5/2002 | Su | |
| 6,389,491 B1 | 5/2002 | Jacobson et al. | |
| 6,391,780 B1 | 5/2002 | Shih et al. | |
| 6,395,152 B1 | 5/2002 | Wang | |
| 6,397,114 B1 | 5/2002 | Eryurek et al. | |
| 6,400,162 B1 | 6/2002 | Mallory et al. | |
| 6,405,096 B1 | 6/2002 | Toprac et al. | |
| 6,405,144 B1 | 6/2002 | Toprac et al. | |
| 6,417,014 B1 | 7/2002 | Lam et al. | |
| 6,427,093 B1 | 7/2002 | Toprac | |
| 6,432,728 B1 | 8/2002 | Tai et al. | |
| 6,435,952 B1 | 8/2002 | Boyd et al. | |
| 6,438,438 B1 | 8/2002 | Takagi et al. | |
| 6,440,295 B1 | 8/2002 | Wang | |
| 6,441,350 B1 * | 8/2002 | Stoddard et al. | 219/497 |
| 6,442,496 B1 | 8/2002 | Pasadyn et al. | |
| 6,449,524 B1 * | 9/2002 | Miller et al. | 700/121 |
| 6,455,415 B1 | 9/2002 | Lopatin et al. | |
| 6,455,937 B1 | 9/2002 | Cunningham | |
| 6,465,263 B1 * | 10/2002 | Coss et al. | 438/14 |
| 6,470,230 B1 | 10/2002 | Toprac et al. | |
| 6,479,902 B1 | 11/2002 | Lopatin et al. | |
| 6,479,990 B1 | 11/2002 | Mednikov et al. | |
| 6,482,660 B2 | 11/2002 | Conchieri et al. | |
| 6,484,064 B1 | 11/2002 | Campbell | |
| 6,486,492 B1 | 11/2002 | Su | |
| 6,492,281 B1 | 12/2002 | Song et al. | |
| 6,495,452 B1 | 12/2002 | Shih | |
| 6,503,839 B2 | 1/2003 | Gonzales et al. | |
| 6,515,368 B1 | 2/2003 | Lopatin et al. | |
| 6,517,413 B1 | 2/2003 | Hu et al. | |
| 6,517,414 B1 | 2/2003 | Tobin et al. | |
| 6,528,409 B1 | 3/2003 | Lopatin et al. | |
| 6,529,789 B1 | 3/2003 | Campbell et al. | |
| 6,532,555 B1 * | 3/2003 | Miller et al. | 714/48 |
| 6,535,783 B1 * | 3/2003 | Miller et al. | 700/121 |
| 6,537,912 B1 | 3/2003 | Agarwal | |
| 6,540,591 B1 | 4/2003 | Pasadyn et al. | |

| | | | | | | |
|---|---|---|---|---|---|---|
| 6,541,401 B1 | 4/2003 | Herner et al. | | EP | 0 877 308 A2 | 11/1998 |
| 6,546,508 B1* | 4/2003 | Sonderman et al. ......... 714/48 | | EP | 0 881 040 A2 | 12/1998 |
| 6,556,881 B1* | 4/2003 | Miller ................... 700/108 | | EP | 0 895 145 A1 | 2/1999 |
| 6,560,504 B1 | 5/2003 | Goodwin et al. | | EP | 0 910 123 | 4/1999 |
| 6,563,308 B2 | 5/2003 | Nagano et al. | | EP | 0 932 194 | 7/1999 |
| 6,567,717 B2 | 5/2003 | Krivokapic et al. | | EP | 0 932 195 A1 | 7/1999 |
| 6,580,958 B1 | 6/2003 | Takano | | EP | 1 066 925 A2 | 1/2001 |
| 6,587,744 B1* | 7/2003 | Stoddard et al. .......... 700/121 | | EP | 1 067 757 | 1/2001 |
| 6,590,179 B2 | 7/2003 | Tanaka et al. | | EP | 1 071 128 | 1/2001 |
| 6,604,012 B1 | 8/2003 | Cho et al. | | EP | 1 083 470 A2 | 3/2001 |
| 6,605,549 B2 | 8/2003 | Leu et al. | | EP | 1 092 505 A2 | 4/2001 |
| 6,607,976 B2 | 8/2003 | Chen et al. | | EP | 1072967 A3 | 11/2001 |
| 6,609,946 B1 | 8/2003 | Tran | | EP | 1 182 526 A2 | 2/2002 |
| 6,616,513 B1 | 9/2003 | Osterheld | | GB | 2 347 885 A | 9/2000 |
| 6,618,692 B2 | 9/2003 | Takahashi et al. | | GB | 2 365 215 A | 2/2002 |
| 6,624,075 B1 | 9/2003 | Lopatin et al. | | JP | 61-66104 | 4/1986 |
| 6,625,497 B2 | 9/2003 | Fairbairn et al. | | JP | 61-171147 | 8/1986 |
| 6,630,741 B1 | 10/2003 | Lopatin et al. | | JP | 01-283934 | 11/1989 |
| 6,640,151 B1 | 10/2003 | Somekh et al. | | JP | 3-202710 | 9/1991 |
| 6,652,355 B2 | 11/2003 | Wiswesser et al. | | JP | 05-151231 | 6/1993 |
| 6,660,633 B1 | 12/2003 | Lopatin et al. | | JP | 05-216896 | 8/1993 |
| 6,678,570 B1 | 1/2004 | Pasadyn et al. | | JP | 05-266029 | 10/1993 |
| 6,708,074 B1 | 3/2004 | Chi et al. | | JP | 06-110894 | 4/1994 |
| 6,708,075 B2 | 3/2004 | Sonderman et al. | | JP | 06-176994 | 6/1994 |
| 6,725,402 B1* | 4/2004 | Coss et al. ............... 714/48 | | JP | 06-184434 | 7/1994 |
| 6,728,587 B2 | 4/2004 | Goldman et al. | | JP | 06-252236 | 9/1994 |
| 6,735,492 B2 | 5/2004 | Conrad et al. | | JP | 06-260380 | 9/1994 |
| 6,751,518 B1 | 6/2004 | Sonderman et al. | | JP | 8-23166 | 1/1996 |
| 6,774,998 B1 | 8/2004 | Wright et al. | | JP | 08-50161 | 2/1996 |
| 6,913,938 B2* | 7/2005 | Shanmugasundram et al. ................ 438/16 | | JP | 08-149583 | 6/1996 |
| | | | | JP | 08-304023 | 11/1996 |
| 2001/0001755 A1 | 5/2001 | Sandhu et al. | | JP | 09-34535 | 2/1997 |
| 2001/0003084 A1 | 6/2001 | Finarov | | JP | 9-246547 | 9/1997 |
| 2001/0006873 A1 | 7/2001 | Moore | | JP | 10-34522 | 2/1998 |
| 2001/0030366 A1 | 10/2001 | Nakano et al. | | JP | 10-173029 | 6/1998 |
| 2001/0039462 A1 | 11/2001 | Mendez et al. | | JP | 11-67853 | 3/1999 |
| 2001/0040997 A1 | 11/2001 | Tsap et al. | | JP | 11-126816 | 5/1999 |
| 2001/0042690 A1 | 11/2001 | Talieh | | JP | 11-135601 | 5/1999 |
| 2001/0044667 A1 | 11/2001 | Nakano et al. | | JP | 2000-183001 | 6/2000 |
| 2002/0032499 A1 | 3/2002 | Wilson et al. | | JP | 2001-76982 | 3/2001 |
| 2002/0058460 A1 | 5/2002 | Lee et al. | | JP | 2001-284299 | 10/2001 |
| 2002/0070126 A1 | 6/2002 | Sato et al. | | JP | 2001-305108 | 10/2001 |
| 2002/0077031 A1 | 6/2002 | Johanssson et al. | | JP | 2002-9030 | 1/2002 |
| 2002/0081951 A1 | 6/2002 | Boyd et al. | | JP | 2002-343754 | 11/2002 |
| 2002/0089676 A1 | 7/2002 | Pecen et al. | | TW | 434103 | 5/2001 |
| 2002/0102853 A1 | 8/2002 | Li et al. | | TW | 436383 | 5/2001 |
| 2002/0107599 A1 | 8/2002 | Patel et al. | | TW | 455938 | 9/2001 |
| 2002/0107604 A1 | 8/2002 | Riley et al. | | TW | 455976 | 9/2001 |
| 2002/0113039 A1 | 8/2002 | Mok et al. | | WO | WO 95/34866 | 12/1995 |
| 2002/0127950 A1 | 9/2002 | Hirose et al. | | WO | WO 98/05066 | 2/1998 |
| 2002/0128805 A1 | 9/2002 | Goldman et al. | | WO | WO 98/45090 | 10/1998 |
| 2002/0149359 A1 | 10/2002 | Crouzen et al. | | WO | WO 99/09371 | 2/1999 |
| 2002/0165636 A1 | 11/2002 | Hasan | | WO | WO 99/25520 | 5/1999 |
| 2002/0183986 A1 | 12/2002 | Stewart et al. | | WO | WO 99/59200 | 11/1999 |
| 2002/0185658 A1 | 12/2002 | Inoue et al. | | WO | WO 00/00874 | 1/2000 |
| 2002/0193899 A1 | 12/2002 | Shanmugasundram et al. | | WO | WO 00/05759 | 2/2000 |
| 2002/0193902 A1 | 12/2002 | Shanmugasundram et al. | | WO | WO 00/35063 | 6/2000 |
| 2002/0197745 A1 | 12/2002 | Shanmugasundram et al. | | WO | WO 00/54325 | 9/2000 |
| 2002/0197934 A1 | 12/2002 | Paik | | WO | WO 00/79355 A1 | 12/2000 |
| 2002/0199082 A1 | 12/2002 | Shanmugasundram et al. | | WO | WO 01/11679 | 2/2001 |
| 2003/0017256 A1 | 1/2003 | Shimane | | WO | WO 01/15865 A1 | 3/2001 |
| 2003/0020909 A1 | 1/2003 | Adams et al. | | WO | WO 01/18623 | 3/2001 |
| 2003/0020928 A1 | 1/2003 | Ritzdorf et al. | | WO | WO 01/25865 | 4/2001 |
| 2003/0154062 A1 | 8/2003 | Daft et al. | | WO | WO 01/33277 | 5/2001 |
| FOREIGN PATENT DOCUMENTS | | | | WO | WO01/33501 A1 | 5/2001 |
| | | | | WO | WO 01/52055 A3 | 7/2001 |
| CA | 2165847 | 8/1991 | | WO | WO 01/52319 | 7/2001 |
| CA | 2194855 | 8/1991 | | WO | WO 01/57823 A2 | 8/2001 |
| EP | 0 397 924 A1 | 11/1990 | | WO | WO 01/080306 | 10/2001 |
| EP | 0 621 522 A2 | 10/1994 | | WO | WO 02/17150 A1 | 2/2002 |
| EP | 0 747 795 A2 | 12/1996 | | WO | WO 02/31613 A2 | 4/2002 |
| EP | 0 869 652 | 10/1998 | | WO | WO 02/31613 A3 | 4/2002 |
| | | | | WO | WO 02/33737 A2 | 4/2002 |

WO  WO 02/074491  9/2002

OTHER PUBLICATIONS

"Equipment and APC integration at AMD with workstream", Lantz, IEEE International Symposium on Semiconductor Manufacturing Conference Proceedings, Oct. 11-13, 1999, pp. 325-327.*

Dishon, G., D. Eylon, M. Finarov, and A. Shulman. "Dielectric CMP Advanced Process Control Based on Integrated Monitoring." Ltd. Rehoveth, Israel: Nova Measuring Instruments.

Feb. 1984. "Method and Apparatus of in Situ Measurement and Overlay Error Analysis for Correcting Step and Repeat Lithographic Cameras." *IBM Technical Disclosure Bulletin*, pp. 4855-4859.

Oct. 1984. "Method to Characterize the Stability of a Step and Repeat Lithographic System." *IBM Technical Disclosure Bulletin*, pp. 2857-2860.

Runyan, W. R., and K. E. Bean. 1990. "Semiconductor Integrated Circuit Processing Technology." p. 48. Reading, Massachusetts: Addison-Wesley Publishing Company.

Zorich, Robert. 1991. *Handbook of Quality Integrated Circuit Manufacturing.* pp. 464-498 San Diego, California: Academic Press, Inc.

Rampalli, Prasad, Arakere Ramesh, and Nimish Shah. 1991. *CEPT—A Computer-Aided Manufacturing Application for Managing Equipment Reliability and Availability in the Semiconductor Industry.* New York, New York: IEEE.

Moyne, James R., Nauman Chaudhry, and Roland Telfeyan. 1995. "Adaptive Extensions to a Multi-Branch Run-to-Run Controller for Plasma Etching." *Journal of Vacuum Science and Technology*. Ann Arbor, Michigan: University of Michigan Display Technology Manufacturing Center.

Moyne, James, Roland Telfeyan, Arnon Hurwitz, and John Taylor. Aug. 1995. "A Process-Independent Run-to-Run Controller and Its Application to Chemical-Mechanical Planarization." *SEMI/IEEE Advanced Semiconductor Manufacturing Conference and Workshop*. Ann Arbor, Michigan: The University of Michigan, Electrical Engineering & Computer Science Center for Display Technology & Manufacturing.

Zhou, Zhen-Hong and Rafael Reif. Aug. 1995. "Epi-Film Thickness Measurements Using Emission Fourier Transform Infrared Spectroscopy—Part II: Real-Time in Situ Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning, William Moyne, Arnon Hurwitz, and John Taylor. Oct. 1995. "A Multi-Level Approach to the Control of a Chemical-Mechanical Planarization Process." Minneapolis, Minnesota: 42nd National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die- and Wafer-level ILD Thickness Variation in CMP Processes." Washington, D.C.: International Electron Devices Meeting.

Schmid, Hans Albrecht. 1995. "Creating the Architecture of a Manufacturing Framework by Design Patterns." Austin, Texas: OOPSLA.

Dishon, G., M. Finarov, R. Kipper, J.W. Curry, T. Schraub, D. Trojan, 4th Stambaugh, Y. Li and J. Ben-Jacob. Feb. 1996. "On-Line Integrated Metrology for CMP Processing." Santa Clara, California: VMIC Speciality Conferences, 1st International CMP Planarization Conference.

Smith, Taber, Duane Boning, James Moyne, Arnon Hurwitz, and John Curry. Jun. 1996. "Compensating for CMP Pad Wear Using Run by Run Feedback Control." Santa Clara, California: VLSI Multilevel Interconnect Conference.

Boning, Duane, William Moyne, Taber Smith, James Moyne, Roland Telfeyan, Arnon Hurwitz, Scott Shellman, and John Taylor. Oct. 1996. "Run by Run Control of Chemical-Mechanical Polishing." *IEEE Trans. CPMT (C)*, vol. 19, No. 4, pp. 307-314.

SEMI. [1986] 1996. "Standard for Definition and Measurement of Equipment Reliability, Availability, and Maintainability (RAM)." SEMI E10-96.

Van Zant, Peter. 1997. *Microchip Fabrication: A Practical Guide to Semiconductor Processing*. Third Edition, pp. 472-478. New York, New York: McGraw-Hill.

Campbell, W. Jarrett, and Anthony J. Toprac. Feb. 11-12, 1998. "Run-to-Run Control in Microelectronics Manufacturing." Advanced Micro Devises, TWMCC.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567-1603, 2000.

Moyne, James, and John Curry, Jun. 1998, "A Fully Automated Chemical-Mechanical Planarization Process." Santa Clara, California: VLSI Multilevel Interconnection (V-MIC) Conference.

SEMI. Jul. 1998. *New Standard: Provisional Specification for CIM Framework Domain Architecture*. Mountain View, California: SEMI Standards. SEMI Draft Doc. 2817.

Consilium. Aug. 1998. *Quality Management Component: QMC™ and QMC-Link™ Overview*. Mountain View, California: Consilium, Inc.

Chemali, Chadi El, James Moyne, Kareemullah Khan, Rock Nadeau, Paul Smith, John Colt, Jonathan Chapple-Sokol, and Tarun Parikh. Nov. 1998. "Multizone Uniformity Control of a CMP Process Utilizing a Pre and Post-Measurement Strategy." Seattle, Washington: SEMETECH Symposium.

Consilium. 1998. *FAB300™*. Mountain View, California: Consilium, Inc.

Khan, Kareemullah, Victor Solakhain, Anthony Ricci, Tier Gu, and James Moyne. 1998. "Run-to-Run Control of ITO Deposition Process." Ann Arbor, Michigan.

U.S. Appl. No. 09/363,966, filed Jul. 29, 1999, Arackaparambil et al., Computer Integrated Manufacturing Techniques.

U.S. Appl. No. 09/469,227, filed Dec. 22, 1999, Somekh et al., Multi-Tool Control System, Method and Medium.

U.S. Appl. No. 09/619,044, filed Jul. 19, 2000, Yuan, System and Method of Exporting or Importing Object Data in a Manufacturing Execution System.

U.S. Appl. No. 09/637,620, filed Aug. 11, 2000, Chi et al., Generic Interface Builder.

U.S. Appl. No. 09/656,031, filed Sep. 6, 2000, Chi et al., Dispatching Component for Associating Manufacturing Facility Service Requestors with Service Providers.

U.S. Appl. No. 09/655,542, filed Sep. 6, 2000, Yuan, System, Method and Medium for Defining Palettes to Transform an Application Program Interface for a Service.

Consilium. Jan. 1999. "FAB300™: Consilium's Next Generation MES Solution of Software and Services which Control and Automate Real-Time FAB Operations." www.

consilium.com/products/fab300_page.htm#FAB399 Introduction.

Consilium. Jul. 1999. "Increasing Overall Equipment Effectiveness (OEE) in Fab Manufacturing by Implementing Consilium's Next-Generation Manufacturing Execution System—MES II." Semiconductor Fabtech Edition 10.

Consilium Corporate Brochure. Oct. 1999. www.consilium.com.

Moyne, James. Oct. 1999. "Advancements in CMP Process Automation and Control." Hawaii: (Invited paper and presentation to) Third International Symposium on Chemical Mechanical Polishing in IC Device Manufacturing: 196th Meeting of the Electrochemical Society.

Consilium. Nov. 1999. *FAB300™ Update*.

SEMI. 2000. "Provisional Specification for CIM Framework Scheduling Component." San Jose, California. SEMI E105-1000.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

U.S. Appl. No. 09/725,908, filed Nov. 30, 2000, Chi et al., Dynamic Subject Information Generation in Message Services of Distributed Object Systems.

U.S. Appl. No. 09/800,980, filed Mar. 8, 2001, Hawkins et al., Dynamic and Extensible Task Guide.

U.S. Appl. No. 09/811,667, filed Mar. 20, 2001, Yuan et al., Fault Tolerant and Automated Computer Software Workflow.

U.S. Appl. No. 09/927,444, filed Aug. 13, 2001, Ward et al., Dynamic Control of Wafer Processing Paths in Semiconductor Manufacturing Processes.

U.S. Appl. No. 09/928,473, filed Aug. 14, 2001, Koh, Tool Services Layer for Providing Tool Service Functions in Conjunction with Tool Functions.

U.S. Appl. No. 09/928,474, filed Aug. 14, 2001, Krishnamurthy et al., Experiment Management System, Method and Medium.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Oct. 15, 2001. Search Report prepared by the Austrian Patent Office for Singapore Patent Application No. 200004286-1.

NovaScan 2020. Feb. 2002. "Superior Integrated Process Control for Emerging CMP High-End Applications."

Johnson, Bob. Jun. 10, 2002. "Advanced Process Control Key to Moore's Law." Gartner, Inc.

Jul. 9, 2002. International Search Report prepared by the European Patent Office for PCT/US01/24910.

Jul. 29, 2002. International Search Report prepared by the European Patent Office for PCT/US01/27407.

U.S. Appl. No. 09/943,383, filed Aug. 31, 2001, Shanmugasundram et al., In Situ Based Control of Semiconductor Processing Procedure.

U.S. Appl. No. 09/943,955, filed Aug. 31, 2001, Shanmugasundram et al., Feedback Control of a Chemical Mechanical Polishing Device Providing Manipulation of Removal Rate Profiles.

U.S. Appl. No. 09/998,372, filed Nov. 30, 2001, Paik, Control of Chemical Mechanical Polishing Pad Conditioner Directional Velocity to Improve Pad Life.

U.S. Appl. No. 09/998,384, filed Nov. 30, 2001, Paik, Feedforward and Feedback Control for Conditioning of Chemical Mechanical Polishing Pad.

U.S. Appl. No. 10/084,092, filed Feb. 28, 2002, Arachaparambil et al., Computer Integrated Manufacturing Techniques.

U.S. Appl. No. 10/100,184, filed Mar. 19, 2002, Al-Bayati et al., Method, System and Medium for Controlling Semiconductor Wafer Processes Using Critical Dimension Measurements.

U.S. Appl. No. 10/135,451, filed May 1, 2002, Shanmugasundram et al., Dynamic Metrology Schemes and Sampling Schemes for Advanced Process Control in Semiconductor Processing.

Jul. 23, 2002. Communication Pursuant to Article 96(2) EPC for European Patent Application No. 00 115 577.9.

Oct. 15, 2002. International Search Report prepared by the European Patent Office for PCT/US02/19062.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126-132.

Hu, Albert, He Du, Steve Wong, Peter Renteln, and Emanuel Sachs. 1994. "Application of Run by Run Controller to the Chemical-Mechanical Planarization Process." IEEE/CPMT International Electronics Manufacturing Technology Symposium. pp. 371-378.

Suzuki, Junichi and Yoshikazu Yamamoto. 1998. "Toward the Interoperable Software Design Models: Quartet of UML, XML, DOM and CORBA." Proceedings IEEE International Software Engineering Standards Symposium. pp. 1-10.

Klein, Bruce. Jun. 1999. "Application Development: XML Makes Object Models More Useful." Informationweek. pp. 1A-6A.

Jensen, Alan, Peter Renteln, Stephen Jew, Chris Raeder, and Patrick Cheung. Jun. 2001. "Empirical-based Modeling for Control of CMP Removal Uniformity." Solid State Technology, vol. 44, No. 6, pp. 101-102, 104,106. Cowan Publ. Corp.: Washington, D.C.

Sarfaty, Moshe, Arulkumar Shanmugasundram, ALexander Schwarm, Joseph Paik, Jimin Zhang, Rong Pan, Martin J. Seamons, Howard Li, Raymond Hung, and Suketu Parikh. Apr./May 2002. "Advance Process Control Solutions for Semiconductor Manufacturing." IEEE/SEMI Advanced Semiconductor Manufacturing Conference. pp. 101-106.

Oct. 4, 2002. International Search Report from PCT/US01/22833.

Oct. 23, 2002. International Search Report from PCT/US01/27406.

Nov. 7, 2002. International Search Report from PCT/US02/19061.

Nov. 11, 2002. International Search Report from PCT/US02/19117.

Nov. 12, 2002. International Search Report from PCT/US02/19063.

Ostanin, Yu. Ya. Oct. 1981. "Optimization of Thickness Inspection of Electrically Conductive Single-Layer Coatings with Laid-on Eddy-Current Transducers (Abstract)." *Defektoskopiya*, vol. 17, No. 10, pp. 45-52. Moscow, USSR.

Feb. 1984. "Substrate Screening Process." *IBM Technical Disclosure Bulletin*, pp. 4824-4825.

Herrmann, D. 1988. "Temperature Errors and Ways of Elimination for Contactless Measurement of Shaft Vibrations (Abstract)." *Technisches Messen™*, vol. 55, No. 1, pp. 27-30. West Germany.

Lin, Kuang-Kuo and Costas J. Spanos. Nov. 1990. "Statistical Equipment Modeling for VLSI Manufacturing: An Application for LPCVD." *IEEE Transactions on Semiconductor Manufacturing*, v. 3, n. 4, pp. 216-229.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43-51.

Larrabee, G. B. May 1991. "The Intelligent Microelectronics Factory of the Future (Abstract)." *IEEE/SEMI International Semiconductor Manufacturing Science Symposium*, pp. 30-34. Burlingame, CA.

Burke, Peter A. Jun. 1991. "Semi-Empirical Modelling of SiO2 Chemical-Mechanical Polishing Planarization." *VMIC Conference, 1991 IEEE*, pp. 379-384. IEEE.

May 1992. "Laser Ablation Endpoint Detector." *IBM Technical Disclosure Bulletin*, pp. 333-334.

Spanos, Costas J., Hai-Fang Guo, Alan Miller, and Joanne Levine-Parrill. Nov. 1992. "Real-Time Statistical Process Control Using Tool Data." *IEEE Transactions on Semiconductor Manufacturing*, v. 5, n. 4, pp. 308-318.

Feb. 1993. "Electroless Plating Scheme to Hermetically Seal Copper Features." *IBM Technical Disclosure Bulletin*, pp. 405-406.

Scarr, J. M. and J. K. Zelisse. Apr. 1993. "New Topology for Thickness Monitoring Eddy Current Sensors (Abstract)." *Proceedings of the 36th Annual Technical Conference*, Dallas, Texas.

Matsuyama, Akira and Jessi Niou. 1993. "A State-of-the-Art Automation System of an ASIC Wafer Fab in Japan." *IEEE/SEMI International Semiconductor Manufacturing Science Syposium*, pp. 42-47.

Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium*, pp. 438-442.

Kurtzberg, Jerome M. and Menachem Levanoni. Jan. 1994. "ABC: A Better Control for Manufacturing." *IBM Journal of Research and Development*, v. 38, n. 1, pp. 11-30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1-11.

Muller-Heinzerling, Thomas, Ulrich Neu, Hans Georg Nurnberg, and Wolfgang May. Mar. 1994. "Recipe-Controlled Operation of Batch Processes with Batch X." *ATP Automatisierungstechnische Praxis*, vol. 36, No. 3, pp. 43-51.

Stoddard, K., P. Crouch, M. Kozicki, and K. Tsakalis. Jun.-Jul. 1994. "Application of Feedforward and Adaptive Feedback Control to Semiconductor Device Manufacturing (Abstract)." *Proceedings of 1994 American Control Conference—ACC '94*, vol. 1, pp. 892-896. Baltimore, Maryland.

Schaper, C. D., M. M. Moslehi, K. C. Saraswat, and T. Kailath. Nov. 1994. "Modeling, Identification, and Control of Rapid Thermal Processing Systems (Abstract)." *Journal of the Electrochemical Society*, vol. 141, No. 11, pp. 3200-3209.

Tao, K. M., R. L. Kosut, M. Ekblad, and G. Aral. Dec. 1994. "Feedforward Learning Applied to RTP of Semiconductor Wafers (Abstract)." *Proceedings of the 33rd IEEE Conference on Decision and Control*, vol. 1, pp. 67-72. Lake Buena Vista, Florida.

Hu, Albert, He Du, Steve Wong, Peter Renteln, and Emmanuel Sachs. 1994. "Application of Run by Run Controller to the Chemical-Mechanical Planarization Process." *IEEE/CPMT International Electronics Manufacturing Technology Symposium*, pp. 371-378.

Spanos, C. J., S. Leang, S.-Y. Ma, J. Thomson, B. Bombay, and X. Niu. May 1995. "A Multistep Supervisory Controller for Photolithographic Operations (Abstract)." *Proceedings of the Symposium on Process Control, Diagnostics, and Modeling in Semiconductor Manufacturing*, pp. 3-17.

Leang, Sovarong, Shang-Yi Ma, John Thomson, Bart John Bombay, and Costas J. Spanos. May 1996. "A Control System for Photolithographic Sequences." *IEEE Transactions on Semiconductor Manufacturing*, vol. 9, No. 2.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical-Mechanical Polishing." *IEEE Transactions on Components, Packaging, and Manufacturing Technology—Part C*, vol. 19, No. 4, pp. 307-314.

Zhe, Ning, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." *IEEE/SEMI 1996 Advanced Semiconductor Manufacturing Conference Workshop*, pp. 375-381.

Yasuda, M., T. Osaka, and M. Ikeda. Dec. 1996. "Feedforward Control of a Vibration Isolation System for Disturbance Suppression (Abstract)." *Proceeding of the 35th IEEE Conference on Decision and Control*, vol. 2, pp. 1229-1233. Kobe, Japan.

Fan, Jr-Min, Ruey-Shan Guo, Shi-Chung Chang, and Kian-Huei Lee. 1996. "Abnormal Tred Detection of Sequence-Disordered Data Using EWMA Method." *IEEE/SEMI Advanced Semiconductor Manufacturing Conference*, pp. 169-174.

Smith, Taber and Duane Boning. 1996. "A Self-Tuning EWMA Controller Utilizing Artificial Neural Network Function Approximation Techniques." *IEEE/CPMT International Electronics Manufacturing Technology Symposium*, pp. 355-363.

Guo, Ruey-Shan, Li-Shia Huang, Argon Chen, and Jin-Jung Chen. Oct. 1997. "A Cost-Effective Methodology for a Run-by-Run EWMA Controller." *6th International Symposium on Semiconductor Manufacturing*, pp. 61-64.

Mullins, J. A., W. J. Campbell, and A. D. Stock. Oct. 1997. "An Evaluation of Model Predictive Control in Run-to-Run Processing in Semiconductor Manufacturing (Abstract)." *Proceedings of the SPIE—The International Society for Optical Engineering Conference*, vol. 3213, pp. 182-189.

Reitman, E. A., D. J. Friedman, and E. R. Lory. Nov. 1997. "Pre-Production Results Demonstrating Multiple-System Models for Yield Analysis (Abstract)." *IEEE Transactions on Semiconductor Manufacturing*, vol. 10, No. 4, pp. 469-481.

Durham, Jim and Myriam Roussel. 1997. "A Statistical Method for Correlating In-Line Defectivity to Probe Yield." *IEEE/SEMI Advanced Semiconductor Manufacturing Conference*, pp. 76-77.

Shindo, Wataru, Eric H. Wang, Ram Akella, and Andrzej J. Strojwas. 1997. "Excursion Detection and Source Isolation in Defect Inspection and Classification." *2nd International Workshop on Statistical Metrology*, pp. 90-93.

Jul. 1998. "Active Controller: Utilizing Active Databases for Implementing Multistep Control of Semiconductor Manufacturing (Abstract)." *IEEE Transactions on Components, Packaging and Manufacturing Technology—Part C*, vol. 21, No. 3, pp. 217-224.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference*, pp. 76-78.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67-69.

Boning, Duane S., Jerry Stefani, and Stephanie W. Butler. Feb. 1999. "Statistical Methods for Semiconductor Manufacturing." *Encyclopedia of Electrical Engineering*, J. G. Webster, Ed.

McIntosh, John. Mar. 1999, "Using CD-SEM Metrology in the Manufacture of Semiconductors (Abstract)." *JOM*, vol. 51, No. 3, pp. 38-39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference*, pp. 164-166.

Meckl, P. H. and K. Umemoto. Aug. 1999. "Achieving Fast Motions in Semiconductor Manufacturing Machinery (Abstract)." *Proceedings of the 1999 IEEE International Conference on Control Applications*, vol. 1, pp. 725-729. Kohala Coast, HI.

Khan, K., C. El Chemali, J. Moyne, J. Chapple-Sokol, R. Nadeau, P. Smith, C., and T. Parikh. Oct. 1999. "Yield Improvement at the Contact Process Through Run-to-Run Control (Abstract)." *24th IEEE/CPMT Electronics Manufacturing Technology Symposium*, pp. 258-263.

Ruegsegger, Steven, Aaron Wagner, James S. Freudenberg, and Dennis S. Grimard. Nov. 1999. "Feedforward Control for Reduced Run-to-Run Variation in Microelectronics Manufacturing." *IEEE Transactions on Semiconductor Manufacturing*, vol. 12, No. 4.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model-Based Control in Microelectronics Manufacturing." *Proceedings of the 38th IEEE Conference on Decision and Control*, Phoenix, Arizona, vol. 4, pp. 4185-4191.

Meckl, P. H. and K. Umemoto. Apr. 2000. "Achieving Fast Motions by Using Shaped Reference Inputs [Semiconductor Manufacturing Machine] (Abstract)." *NEC Research and Development*, vol. 41, No. 2, pp. 232-237.

Oechsner, R., T. Tschaftary, S. Sommer, L. Pfitzner, H. Ryssel, H. Gerath, C. Baier, and M. Hafner. Sep. 2000. "Feed-forward Control for a Lithography/Etch Sequence (Abstract)." *Proceedings of the SPIE—The International Society for Optical Engineering Conference*, vol. 4182, pp. 31-39.

Cheung, Robin. Oct. 18, 2000. "Copper Interconnect Technology." *AVS/CMP User Group Meeting*, Santa Clara, CA.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica* v. 36, n. 11.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995-1000. St. Louis, Missouri.

ACM Research Inc. 2000. "Advanced Copper Metallization for 0.13 to 0.05 µm & Beyond." <http://acmrc.com/press/ACM-ECP-brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference*, pp. 437-443.

Chen, Argon and Ruey-Shan Guo. Feb. 2001. "Age-Based Double EWMA Controller and Its Application to CMP Processes." *IEEE Transactions on Semiconductor Manufacturing*, vol. 14, No. 1, pp. 11-19.

Tobin, K. W., T. P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K. Z. Tang. May-Jun. 2001. "Precision Motion Control System for Ultra-Precision Semiconductor and Electronic Components Manufacturing (Abstract)." *51st Electronic Components and Technology Conference 2001. Proceedings*, pp. 1372-1379. Orlando, Florida.

Heuberger, U. Sep. 2001. "Coating Thickness Measurement with Dual-Function Eddy-Current & Magnetic Inductance Instrument (Abstract)." *Galvanotechnik*, vol. 92, No. 9, pp. 2354-2366+IV.

Wang, LiRen and Hefin Rowlands. 2001. "A Novel NN-Fuzzy-SPC Feedback Control System." *8th IEEE International Conference on Emerging Technologies and Factory Automation*, pp. 417-423.

Moyne, J., V. Solakhian, A. Yershov, M. Anderson, and D. Mockler-Hebert. Apr.-May 2002. "Development and Deployment of a Multi-Component Advanced Process Control System for an Epitaxy Tool (Abstract)." *2002 IEEE Advanced Semiconductor Manufacturing Conference and Workshop*, pp. 125-130.

Sarfaty, M., A. Shanmugasundram, A. Schwarm, J. Paik, Jimin Zhang, Rong Pan, M. J. Seamons, H. Li, R. Hung, and S. Parikh. Apr.-May 2002. "Advance Process Control Solutions for Semiconductor Manufacturing (Abstract)." *13th Annual IEEE/SEMI Advanced Semiconductor Manufacturing Conference, Advancing the Science and Technology of Semiconductor Manufacturing. ASMC 2002*, pp. 101-106. Boston, MA.

Campbell, W. J., S. K. Firth, A. J. Toprac, and T. F. Edgar. May 2002. "A Comparison of Run-to-Run Control Algorithms (Abstract)." *Proceedings of 2002 American Control Conference*, vol. 3, pp. 2150-2155.

Good, Richard and S. Joe Qin. May 2002. "Stability Analysis of Double EWMA Run-to-Run Control with Metrology Delay." *IEEE/CPMT International Electronics Manufacturing Technology Symposium*, pp. 355-363.

Smith, Stewart, Anthony J. Walton, Alan W. S. Ross, Georg K. H. Bodammer, and J. T. M. Stevenson. May 2002.

"Evaluation of Sheet Resistance and Electrical Linewidth Measurement Techniques for Copper Damascene Interconnect." *IEEE Transactions on Semiconductor Manufacturing*, vol. 15, No. 2, pp. 214-222.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference*, pp. 285-287.

ACM Research, Inc. 2002. "ACM Ultra ECP® System: Electro-Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shipped to Major CMP Tool Manufacturer." www.kla-tencor.com/news_events/press_releases/press_releases2001/984086002.html.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous Low-k/Copper Integration by Using Electro-Chemical Polishing." *2002 Symposium on VLSI Technology Digest of Technical Papers*, pp. 32-33.

Cunningham, James A. 2003. "Using Electrochemistry to Improve Copper Interconnects." <http://www.e-insite.net/semiconductor/index.asp?layout=article&Articleid=CA47465>.

Mar. 25, 2003. International Search Report for PCT/US02/24859 prepared by the European Patent Office.

Adams, Bret W., Bogdan Swedek, Rajeev Bajaj, Fritz Redeker, Manush Birang, and Gregory Amico. "Full-Wafer Endpoint Detection Improves Process Control in Copper CMP." *Semiconductor Fabtech—12th Edition*. Applied Materials, Inc., Santa Clara, CA.

Berman, Mike, Thomas Bibby, and Alan Smith. "Review of In Situ & In-line Detection for CMP Applications." *Semiconductor Fabtech*, 8th Edition, pp. 267-274.

"Semiconductor Manufacturing: An Overview." <http://users.ece.gatech.edu/~gmay/overview.html>.

Sonderman, Thomas. 2002. "APC as a Competitive Manufacturing Technology: AMD's Vision for 300mm." AMD.

Semiconductor FABTECH. Printed Jul. 2001. "Motorola and Advanced Micro Devices Buy ObjectSpace Catalyst Advanced Process Control Product for Five Wafer Fabs." www.semiconductorfabtech.com/industry.news/9907/20.07.shtml.

Baliga, John. Jul. 1999. "Advanced Process Control: Soon to be a Must." Semiconductor International. www.semiconductor.net/semiconductor/issues/issues/1999/jul99/docs/feature 1.asp.

Levine, Martin D. 1985. *Vision in Man and Machine*. New York: McGraw-Hill, Inc. pp. ix-xii, 1-58.

Pilu, Maurizio. Sep. 2001. "Undoing Page Curl Distortion Using Applicable Surfaces." *IEEE International Conference on Image Processing*. Thessalonica, Greece.

Williams, Randy, Dadi Gudmundsson, Kevin Monahan, Raman Nurani, Meryl Stoller and J. George Shanthikumar. Oct. 1999. "Optimized Sample Planning for Wafer Defect Inspection," *Semiconductor Manufacturing Conference Proceedings, 1999 IEEE International Symposium on Santa Clara, CA*. Piscataway, NJ. pp. 43-46.

Jul. 23, 2003. Invitation to Pay Additional Fees and Communication Relating to the Results of the Partial International Search for PCT/US02/19116.

Aug. 1, 2003. Written Opinion for PCT/US01/27406.

Aug. 20, 2003. Written Opinion for PCT/US01/22833.

Miller, G. L., D. A. H. Robinson, and J. D. Wiley. Jul. 1976. "Contactless measurement of semiconductor conductivity by radio frequency-free-carrier power absorption." *Rev. Sci. Instrum.*, vol. 47, No. 7, pp. 799-805.

1999. "Contactless Bulk Resistivity/Sheet Resistance Measurement and Mapping Systems." www.Lehighton.com/fabtech1/index.html.

2000. "Microsense II Capacitance Gaging System." www.adetech.com.

El Chemali, Chadi et al. Jul./Aug. 2000. "Multizone uniformity control of a chemical mechanical polishing process utilizing a pre- and postmeasurement strategy." *J. Vac. Sci. Technol.* vol. 18, No. 4, pp. 1287-1296.

Mar. 5, 2001. "KLA-Tencor Introduces First Production-worthy Copper CMP In-situ Film Thickness and End-point Control System." http://www.kla-tencor.com/j/servlet/NewsItem?newsItemID=74.

2002. "Microsense II—5810: Non-Contact Capacitance Gaging Module." www.adetech.com.

Aug. 8, 2003. PCT International Search Report from PCT/US03/08513.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

"NanoMapper wafer nanotopography measurement by ADE Phase Shift." http://www.phase-shift.com/nanomap.shtml.

"Wafer flatness measurement of advanced wafers." http://www.phase-shift.com/wafer-flatness.shtml.

"ADE Technologies, Inc.—6360." http://www.adetech.com/6360.shtml.

"3D optical profilometer MicroXAM by ADE Phase Shift." http://www.phase-shift.com/microxam.shtml.

"NanoMapper FA factory automation wafer nanotopography measurement." http://www.phase-shift.com/nanomapperfa.shtml.

Rocha, Joao and Carlos Ramos. Sep. 12, 1994. "Task Planning for Flexible and Agile Manufacturing Systems." *Intelligent Robots and Systems '94. Advanced Robotic Systems and the Real World, IROS '94. Proceedings of the IEEE/RSJ/GI International Conference on Munich, Germany Sep. 12-16, 1994*. New York, New York: IEEE. pp. 105-112.

Mar. 15, 2002. Office Action for U.S. Appl. No. 09/469,227, filed Dec. 22, 1999.

Mar. 29, 2002. Office Action for U.S. Appl. No. 09/363,966, filed Jul. 29, 1999.

Jun. 20, 2002. Office Action for U.S. Appl. No. 09/619,044, filed Jul. 19, 2000.

Sep. 26, 2002. Office Action for U.S. Appl. No. 09/637,620, filed Aug. 11, 2000.

Oct. 23, 2002. Office Action for U.S. Appl No. 09/469,227, filed Dec. 22, 1999.

Dec. 17, 2002. Office Action for U.S. Appl. No. 09/363,966, filed Jul. 29, 1999.

Feb. 10, 2003. Office Action for U.S. Appl. No. 09/619,044, filed Jul. 19, 2000.

Apr. 9, 2003. Office Action for U.S. Appl. No. 09/928,474, filed Aug. 14, 2001.
May 8, 2003. Office Action for U.S. Appl. No. 09/637,620, filed Aug. 11, 2000.
Jun. 18, 2003. Office Action for U.S. Appl. No. 09/655,542, filed Sep. 6, 2000.
Aug. 8, 2003. International Search Report for PCT/US03/08513.
Aug. 25, 2003. Office Action for U.S. Appl. No. 10/100,184, filed Mar. 19, 2002.
Sep. 15, 2003. Office Action for U.S. Appl. No. 09/928,474, filed Aug. 14, 2001.
Nov. 5, 2003. Office Action for U.S. Appl. No. 10/172,977, filed Jun. 18, 2002.
Dec. 1, 2003. Office Action for U.S. Appl. No. 10/173,108, filed Jun. 18, 2002.
Dec. 11, 2003. Office Action for U.S. Appl. No. 09/943,383, filed Aug. 31, 2001.
Dec. 16, 2003. International Search Report for PCT/US03/23964.
Jan. 20, 2004. Office Action for U.S. Appl. No. 09/927,444, filed Aug. 13, 2001.
Jan. 23, 2004. International Search Report for PCT/US02/24860.
Feb. 2, 2004. Office Action for U.S. Appl. No. 09/363,966, filed Jul. 29, 1999.
Sep. 15, 2004. Office Action for U.S. Appl. No. 10/632,107, filed Aug. 1, 2003.
Sep. 29, 2004. Office Action for U.S. Appl. No. 09/363,966, filed Jul. 29, 1999.
Oct. 1, 2004. International Preliminary Examination Report for PCT Serial No. PCT/US03/23964.
Oct. 6, 2004. Office Action for U.S. Appl. No. 10/759,108, filed Jan. 20, 2004.
Oct. 12, 2004. International Preliminary Examination Report for PCT Serial No. PCT/US02/19061.
Nov. 17, 2004. Written Opinion for PCT Serial No. PCT/US01/27407.
Sep. 9, 2004. Written Opinion for PCT Serial No. PCT/US02/21942.
IslamRaja, M. M., C. Chang, J. P. McVittie, M. A. Cappelli, and K. C. Saraswat. May/Jun. 1993. "Two Precursor Model for Low-Pressure Chemical Vapor Deposition of Silicon Dioxide from Tetraethylorthosilicate." *J. Vac. Sci. Technol. B*, vol. 11, No. 3, pp. 720-726.
Kim, Eui Jung and William N. Gill. Jul. 1994. "Analytical Model for Chemical Vapor Deposition of $SiO_2$ Films Using Tetraethoxysliane and Ozone" (Abstract). *Journal of Crystal Growth*, vol. 140, Issues 3-4, pp. 315-326.
Jul. 15, 2004. Office Action for U.S. Appl. No. 10/172,977, filed Jun. 18, 2002.
Aug. 2, 2004. Office Action for U.S. Appl. No. 10/174,377, filed Jun. 18, 2002.
Aug. 9, 2004. Written Opinion for PCT Serial No. PCT/US02/19063.
Aug. 18, 2004. International Preliminary Examination Report for PCT Serial No. PCT/US02/19116.
Aug. 25, 2004. Office Action for U.S. Appl. No. 09/998,384, filed Nov. 30, 2001.
Sep. 16, 2004. International Preliminary Examination Report for PCT Serial No. PCT/US02/24859.
Sun, S.C. 1998. "CVD and PVD Transition Metal Nitrides as Diffusion Barriers for Cu Metallization." *IEEE*. pp. 243-246.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." *IEEE*. pp. 635-638.
Yamagishi, H., Z. Tokei, G.P. Beyer, R. Donaton, H. Bender, T. Nogami, and K. Maex. 2000. "TEM/SEM Investigation and Electrical Evaluation of a Bottomless I-PVD TA(N) Barrier in Dual Damascene" (Abstract). *Advanced Metallization Conference 2000*. San Diego, CA.
Eisenbraun, Eric, Oscar van der Straten, Yu Zhu, Katharine Dovidenko, and Alain Kaloyeros. 2001. "Atomic Layer Deposition (ALD) of Tantalum-Based Materials for Zero Thickness Copper Barrier Applications" (Abstract). *IEEE*. pp. 207-209.
Smith, S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backend Structures" (Abstract). *Advanced Metallization Conference 2001*. Montreal, Quebec.
Kim, Y.T. and H. Sim. 2002. "Characteristics of Pulse Plasma Enhanced Atomic Layer Deposition of Tungsten Nitride Diffusion Barrier for Copper Interconnect" (Abstract). *IEIC Technical Report*. vol. 102, No. 178, pp. 115-118.
Elers, Kai-Erik, Ville Saanila, Pekka J. Soininen, Wei-Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13-14, pp. 149-153.
Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." *IEEE*. pp. 603-606.
Van der Straten, O., Y. Zhu, E. Eisenbraun, and A. Kaloyeros. 2002. "Thermal and Electrical Barrier Performance Testing of Ultrathin Atomic Layer Deposition Tantalum-Based Materials for Nanoscale Copper Metallization." *IEEE*. pp. 188-190.
Wu, Z.C., Y.C. Lu, C.C. Chiang, M.C. Chen, B.T. Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65-nm BEOL Technology." *IEEE*. pp. 595-598.
Jul. 25, 2003. International Search Report for PCT/US02/24858.
Mar. 30, 2004. Written Opinion for PCT/US02/19062.
Apr. 9, 2004. Written Opinion for PCT/US02/19116.
Apr. 22, 2004. Office Action for U.S. Appl. No. 09/998,372, filed Nov. 30, 2001.
Apr. 28, 2004. Written Opinion for PCT/US02/19117.
Apr. 29, 2004. Written Opinion for PCT/US02/19061.
May 5, 2004. Office Action for U.S. Appl. No. 09/943,955, filed Aug. 31, 2001.
May 5, 2004. International Preliminary Examination Report for PCT/US01/27406.
May 28, 2004. Office Action for U.S. Appl. No. 09/943,383, filed Aug. 31, 2001.
Jun. 3, 2004. Office Action for U.S. Appl. No. 09/928,474, filed Aug. 14, 2001.
Jun. 23, 2004. Office Action for U.S. Appl. No. 10/686,589, filed Oct. 17, 2003.
Jun. 30, 2004. Office Action for U.S. Appl. No. 09/800,980, filed Mar. 8, 2001.
Jul. 12, 2004. Office Action for U.S. Appl. No. 10/173,108, filed Jun. 8, 2002.

Boning, Duane et al. "Run by Run Control of Chemical-Mechanical Polishing." *IEEE Trans*. Oct. 1996. vol. 19, No. 4. pp. 307-314.

Moyne, James et al. "A Run-to-Run Control Framework for VLSI Manufacturing." *Microelectronic Processing '93 Conference Proceedings*. Sep. 1993.

Telfeyan, Roland et al. "Demonstration of a Process-Independent Run-to-Run Controller." *187th Meeting of the Electrochemical Society*. May 1995.

Moyne, James et al. "A Process-Independent Run-to-Run Controller and Its Application to Chemical-Mechanical Planarization." *SEMI/IEEE* Adv. Semiconductor Manufacturing Conference. Aug. 15, 1995.

Moyne, James et al. "Adaptive Extensions to be a Multi-Branch Run-to-Run Controller for Plasma Etching." *Journal of Vacuum Science and Technology*. 1995.

Sachs, Emanuel et al. "Process Control System for VLSI Fabrication".

Chaudhry, Nauman et al. "Active Controller: Utilizing Active Databases for Implementing Multi-Step Control of Semiconductor Manufacturing." *University of Michigan*. pp. 1-24.

Chaudhry, Nauman et al, "Designing Databases with Fuzzy Data and Rules for Application to Discrete Control." *University of Michigan*. pp. 1-21.

Chaudhry, Nauman A. et al. "A Design Methodology for Databases with Uncertain Data." *University of Michigan*. pp. 1-14.

Khan, Kareemullah et al. "Run-to-Run Control of ITO Deposition Process." *University of Michigan*. pp. 1-6.

Moyne, James et al. "Yield Improvement @ Contact Through Run-to-Run Control".

Kim, Jiyoun et al. "Gradient and Radial Uniformity Control of a CMP Process Utilizing a Pre- and Post- Measurement Strategy," *University of Michigan*.

Apr. 26, 2005. International Preliminary Examination Report for PCT Serial No. PCT/US02/21942.

US 6,150,664, 11/2000, Su (withdrawn)

* cited by examiner

INTEGRATION OF FAULT DETECTION WITH RUN-TO-RUN CONTROL

CROSS REFERENCE TO RELATED APPLICATION

This application claims the benefit of U.S. Provisional Application No. 60/305,140 filed on Jul. 16, 2001, which is incorporated herein by reference.

FIELD OF THE INVENTION

The present invention relates generally to semiconductor manufacture. More particularly, the present invention relates to techniques for manufacturing semiconductors by integrating fault detection concepts with run-to-run control.

BACKGROUND OF THE INVENTION

In typical semiconductor manufacturing processes, semiconductor wafers, or simply wafers, are advanced through a number of stations within what is referred to as a fab. At each location in this assembly line-like process, processing equipment or tools perform processing operations to modify the wafers. For example, one tool may add various layers onto the wafers (e.g., a deposition tool) while another may modify the layers (e.g., etching tools) to form a completed semiconductor product.

As they are moved through the assembly line, periodic quality checks are performed on the wafers. The quality checks typically include measuring widths of microscopic lines and film thicknesses on the wafer for aberrations. With many of the quality checks, the measurements can only be made after the wafers have undergone processing operations subsequent to those responsible for producing the aberrations. Furthermore, a period of time and a number of process steps typically pass between the introduction of the aberration and their detection. Thus, a number of processes may be performed on a wafer even after an aberration has been introduced. Similarly, a tool may continue processing wafers even after it has begun introducing aberrations. In either case, a number of wafers must be scrapped.

Conventional techniques are known for addressing some of these problems. Two examples include run-to-run control and fault detection.

Generally speaking, run-to-run control addresses process output drifts (i.e., drifts from process targets) by using data from outgoing and incoming wafers with modeling techniques to adjust process parameters. These drifts relate to slight changes in the way the tool produces output due to normal tool use. For example, with chemical mechanical polishing (CMP) processes, polishing pads used to reduce film thickness wear out over time. As a result, worn polishing pads inevitably require more time than new pads to produce a desired thickness. Run-to-run control may be used to address these types of problems by adjusting a process parameter such as polishing time to account for issues such as wear on a polishing pad.

Run-to-run control uses metrology data taken at one or more process steps to adjust process recipes (i.e., a set of predefined process parameters required to effectuate a processing outcome) on a run-to-run basis. A run may constitute one or more steps of a manufacturing process of a wafer. It may include a batch of wafer lots, a single lot or even a single wafer, depending on the particular needs and capabilities of the process step and the fab. In general, run-to-run control uses the data measured at each process or tool to keep wafer properties (e.g., film thickness, uniformity, etc.) close to their nominal values by making slight modifications or adjustments to the setpoints in each tool's recipe. In typical cases, data taken during or immediately after a process step on a particular tool is fed back to adjust the recipe for the following run. Similarly, data may be sent to the next tool to adjust downstream recipes. In this manner, run-to-run control may be used to address process output drifts.

While run-to-run control may be used to address process drifts, it is inadequate for situations where a tool is simply no longer capable of producing an acceptable product, regardless of adjustments made to the recipe setpoints. Similarly, run-to run control does not address situations where a wafer contains a flaw. These situations are termed tool or wafer property faults. A tool that has experienced a fault or failure condition causes the introduction of aberrations or flaws into the wafers. Similarly, a wafer property fault indicates a condition on the wafer that is beyond repair. A number of methods may be used to detect these conditions. For example, a significant drop in temperature from the temperature required to perform the given process operation may signify a fault. Another example of a fault condition may be a spike in a flow rate of a process material. In these instances, run-to-run controllers treat the fault as a drift and attempt to remedy the situation by adjusting the tool's recipe even though the adjustments simply are not capable of addressing the problem. Thus, instead of returning the tool to acceptable operating conditions, the tool continues to introduce aberrations in subsequent wafers or continues processing a flawed wafer thereby resulting in additional waste.

Fault detection, in contrast to run-to-run control, monitors process equipment parameters and wafer attributes to detect tool and wafer property failure or fault conditions. Fault detection systems collect process data and analyze the data for an abnormality or fault during the operation of the process equipment. If a fault is detected, the fault detection system may have various methods of reacting. For example, the system may notify an equipment operator or even terminate execution of process equipment.

While fault detection is adequate for dealing with tool or wafer property failure situations, it does nothing to address process drifts. Thus, until a tool or process fails, fault detection systems remain silent and allow the tools to drift from optimal operating conditions.

As such, it is apparent that a need exists for increasingly efficient techniques for processing wafers. More particularly, what is needed is a system that is capable of addressing both process drifts and fault conditions.

SUMMARY OF THE INVENTION

The present invention addresses the problems described above by integrating run-to-run and fault detection techniques. Specifically, semiconductor wafers and other items are processed in conjunction with a manufacturing execution system using a run-to-run controller and a fault detection system. Initially, and in accordance with one more embodiments of the present invention, a recipe is received from the manufacturing execution system by the run-to-run controller for controlling a tool. This recipe includes a setpoint for obtaining one or more target wafer properties. From there, processing of the wafers is monitored by measuring processing attributes including fault conditions and wafer properties using the fault detection system and/or a sensor. These processing attributes are forwarded from the fault detection system to the run-to-run controller. As a result, setpoints of the recipe may be modified by the run-to-run controller according to the processing attributes to maintain the target wafer properties, except in cases when a fault condition is detected by the fault detection system.

In another (or parallel) embodiment, wafers are also processed according to a recipe. This recipe includes at least one setpoint for obtaining one or more target wafer properties. This technique also includes measuring wafer properties, and detecting conditions indicative of a fault condition (e.g., either wafer or equipment faults). If a fault condition is not detected, the setpoint of the recipe is modified according to the measured wafer properties to maintain the target wafer properties. In some embodiments, if a fault condition is detected, the process is terminated.

In other (or parallel) embodiments, wafer properties may be measured before execution of processing. In still yet other (or parallel) embodiments, two or more setpoints of the recipe, which may include temperature, pressure, power, processing time, lift position and flow rate of a material, are modified.

In other (or parallel) embodiments, fault detection models may be used to define a range of conditions indicative of a fault condition. In these embodiments, the fault detection models may be modified to incorporate, as parameters, setpoints of a recipe modified by a run-to-run controller.

BRIEF DESCRIPTION OF THE DRAWINGS

Various objects, features, and advantages of the present invention can be more fully appreciated as the same become better understood with reference to the following detailed description of the present invention when considered in connection with the accompanying drawings, in which.

DETAILED DESCRIPTION OF THE INVENTION

In accordance with one or more embodiments of the present invention, a technique is provided for processing semiconductor wafers in conjunction with a manufacturing execution system using a run-to-run controller and a fault detection system. More particularly, the manufacturing execution system transfers a recipe to the run-to-run controller for controlling a tool. This recipe includes a setpoint for obtaining one or more target wafer properties. In addition, the fault detection system monitors processing of the wafers by measuring processing attributes including fault conditions and wafer properties. The run-to-run controller modifies the setpoints of the recipe according to the processing attributes (received from the fault detection system as well as e.g., other information gathering sources) to maintain the target wafer properties, except in cases when a fault condition is detected by the fault detection system.

Figure 1:
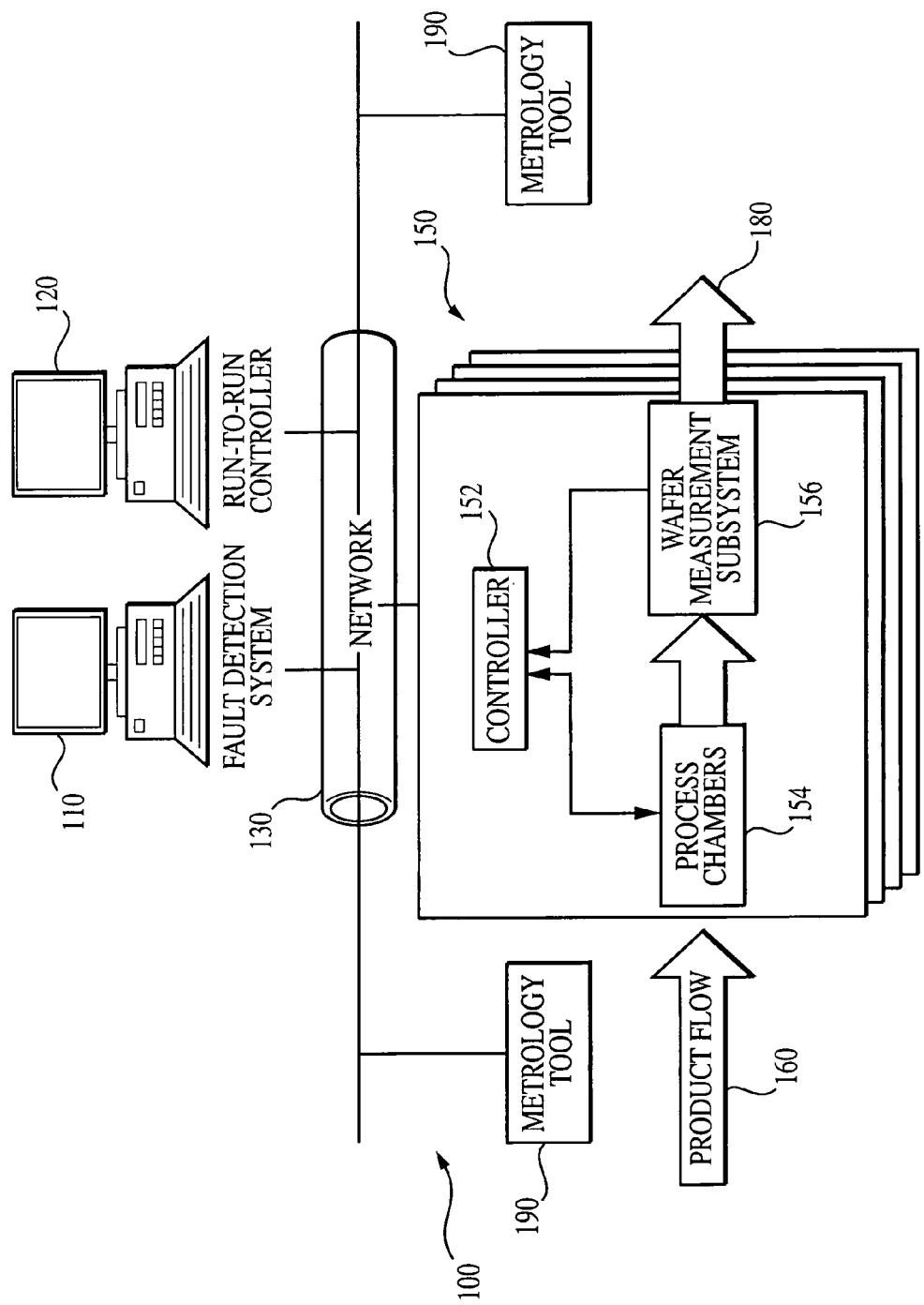
FIG. 1 is a hardware block diagram representation of at least one example of a portion of semiconductor manufacturing system utilizable for implementing at least some of the concepts of the present invention.

FIG. 1 depicts at least one example of a hardware block diagram representation of a portion of a semiconductor manufacturing system 100 utilizable for implementing at least one or more aspects of the present invention. As shown in FIG. 1, semiconductor manufacturing system 100 includes, among other components, a fault detection system 110, a run-to-run controller 120, and one or more pieces of process equipment or tools 150, each interconnected via network 130. As mentioned above, fault detection system 110 is responsible for monitoring one or more tools 150 and wafers for purposes of detecting fault conditions. Run-to-run controller 120 is responsible for modifying tool recipes for purposes of increasing manufacturing efficiency. Although FIG. 1 depicts fault detection system 110 and run-to-run controller 120 as being separate or distinct components, one or more embodiments of the present invention contemplate implementing fault detection system 110 and run-to-run controller 120 in a single computing node.

In addition to run-to-run controller 120 and fault detection system 110, one or more embodiments of the present invention contemplate that any number of metrology tools or sensors 190 may be positioned upstream or downstream from each of the one or more tools 150 for measuring wafer properties immediately before or after processing by the one or more tools 150. Metrology tools 190, if utilized, may be linked to the remainder of system 100 via network 130. Similarly, input wafer properties may also be received from an upstream or feed-forward tool (e.g., a tool positioned upstream from another tool). Thus, the properties may be measured by sensors at another tool at the end of or during a previous manufacturing step and forwarded for use in the instant tool. Examples of such metrology tools 190 include the RS-75™ offered by KLA-Tencor of San Jose, Calif.

The one or more tools 150 may be any number of different types of tools utilized for processing a wafer to produce a desired output. Examples include CMP, lithography, deposition, or etching tools, and the like. In one or more embodiments of the present invention, the one or more tools can include a controller 152, any number of process chambers 154, and a wafer measurement subsystem 156. As will be discussed in greater detail below, controller 152 utilizes information from fault detection system 110 and run-to-run controller 120 to process the wafers. In operation, incoming wafers 160 are initially moved into process chamber 154. From there, the wafers are processed and subsequently moved out of the tool. Examples of some process chambers include dual plasma etch chambers and CMP polishing chambers.

Wafer measurement subsystem 156 is used to measure wafer properties before, during and/or after wafer processing. These properties depend on the type of tool(s) at issue, and may include film thickness, uniformity, and the like. Wafer measurement subsystem 156 may include in situ sensors capable of measuring wafer parameters in real-time during processing. Similarly, wafer measurement subsystem 156 may include an integrated or inline sensor located within or proximate to process chambers 154 for near real-time measurements. Examples of in situ sensors include the In Situ Removal Monitor offered by Applied Materials, Inc. of Santa Clara, Calif. Examples of integrated or inline sensors include tools integrated with metrology techniques (e.g., Nova 2020™ offered by Nova Measuring Instruments, Ltd. of Rehovot, Israel or Nano 9000™ offered by Nanometric of Santa Clara, Calif.).

Generally speaking, the one or more tools 150 performs operations on incoming wafers 160 in accordance with a process recipe, or, in other words, a set of predefined process parameters required to effectuate a processing outcome. For example, a typical recipe may dictate one or more setpoints for any number of processes required to effect a desired output. Thus, a recipe may identify the required temperature, pressure, power, processing time, lift position and flow rate of a material needed to produce a particular wafer result. In addition, other properties may be included as well. In accordance with one or more embodiments of the present invention, controller 152 utilizes information received from, for example, upstream metrology tools and previous operations or runs of the one or more tools 150 to modify these recipes, when necessary. Thus, a measured film thickness of an incoming wafer may be provided to controller 152 along with the results of previous runs prior to processing. This information, then, may be used by controller 152 to modify one or more setpoints of the process recipe to increase production efficiency.

During processing, wafer measurement subsystem 156 may be utilized to measure any number of wafer properties. In addition, wafer properties may also be measured immediately before or after processing. In one or more embodiments of the present invention, subsystem 156 may be used to detect completion of processing (e.g., via endpoint detection and the like). Once processing has been completed, the wafers are moved out of process chamber 154 to, for example, a downstream tool. Any wafer properties collected upon completion of processing, either by wafer measurement subsystem 156 or another metrology tool, may be forwarded to a downstream tool. Similarly, the measured properties may be forwarded to controller 152, fault detection system 110, and/or run-to-run controller 120 for use in modifying future runs. As will be discussed below, the data forwarded to fault detection system 110 and run-to-run controller 120 may be analyzed for detecting any fault conditions and for use in modifying subsequent process recipes.

Figure 2:
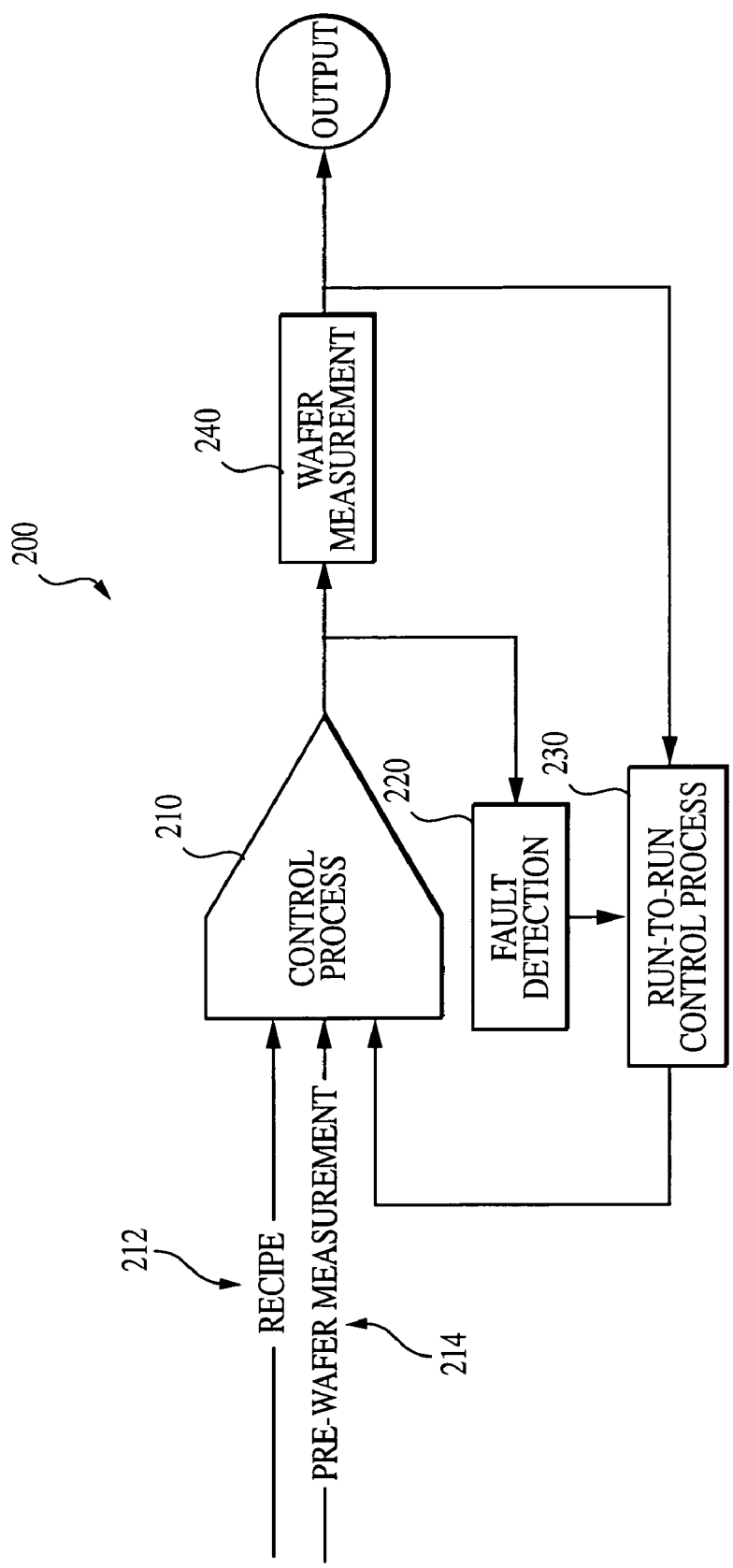
FIG. 2 illustrates at least one example of a control system implementable by the semiconductor manufacturing system of FIG. 1 for producing semiconductor wafers.

Referring to FIG. 2, one example of a control system 200 implementable by semiconductor manufacturing system 100 is illustrated. As shown in FIG. 2, control system 200 includes a control process 210, fault detection process 220, run-to-run process 230, and wafer measurement process 240. Control process 210 controls operation of one or more of tools 150, using, for example, a control algorithm or the like. For instance, control process 210 may be responsible for selecting a tool or process recipe used to process a wafer. This process recipe may be inputted or downloaded into system 200 by, for example, a process engineer or the like. The recipe identifies, in part, a desired outcome or final product to be produced, as specified by any number of target properties. These target properties may include for example a final desired film thickness to be produced by a CMP tool. In addition, control process 210 also receives any number of pre wafer measurements 214 from, for example, an upstream metrology tool. These measurements describe to control process 210 the characteristics of an incoming wafer, and are used to determine the recipe setpoints, as will be discussed below.

Using these inputs (i.e., recipe 212 and measurements 214), control process 210 generates specific setpoints for effecting a desired outcome. As known to those skilled in the art, control process 210 analyses the target properties and measurements 214 using, for example, a model for predicting the expected outputs based on certain inputs. In this case, the target properties, (e.g., film thickness) and prewafer measurements (e.g., an actual thickness) are entered. Then, based on a model the setpoints required to obtain the desired target properties may be predicted. In one or more embodiments of the present invention, the model may be entered or implemented by, for example, a process engineer or the like during a system initialization phase. Generally speaking, any suitable semiconductor wafer manufacturing model may be utilized.

In use, the measurements of any number of wafer properties are collected before, during and/or after processing by wafer measurement system 240. These properties are then forwarded to run-to-run process 230. Run-to-run process 230 analyzes the wafer properties measured by wafer measurement system 240 and determines whether any modifications can be made to the tool's process recipe (via e.g., control process 210) to increase efficiency. To illustrate, as described above, in a CMP polishing operation, polishing pads tend to wear out with use. As a result, worn polishing pads require greater polishing times than new pads to obtain a particular film thickness. Run-to-run process 230 may be used to recognize that a greater amount of time is required and direct the polishing tool to increase its polishing time when needed (e.g., when a pad has worn out). Thus, the results of the run-to-run process's analysis may be forwarded to control process 210 for use in addressing process drifts in subsequent operations.

In accordance with one or more embodiments of the present invention, fault detection process 220 is used by system 200 to detect fault conditions. As will be described in greater detail below, fault detection process 220 uses data collected by, for example, in situ or integrated sensors during processing. One or more embodiments envision that a fault detection index is generated for these purposes. Specifically, this index may be utilized by control process 210 to determine whether to make adjustments to the process recipes. For instance, the fault detection index and the results of the analysis produced by run-to-run control process 230, which together constitute at least some of the processing attributes used by the invention, are forwarded to control process 210 and analyzed to determine whether a change should be made to the process recipes. For example, run-to-run control process 230 generates modifications to a recipe and fault detection process 220 identifies instances where the modification should or should not be implemented. Accordingly, control process 210 is able to modify a recipe only when appropriate (i.e., when the tool recipe may be adjusted in a manner that remedies an addressable problem or inefficiency). Thus, system 200 is able to refrain from implementing modifications generated according to run-to-run techniques under "fault" conditions.

Figure 3:
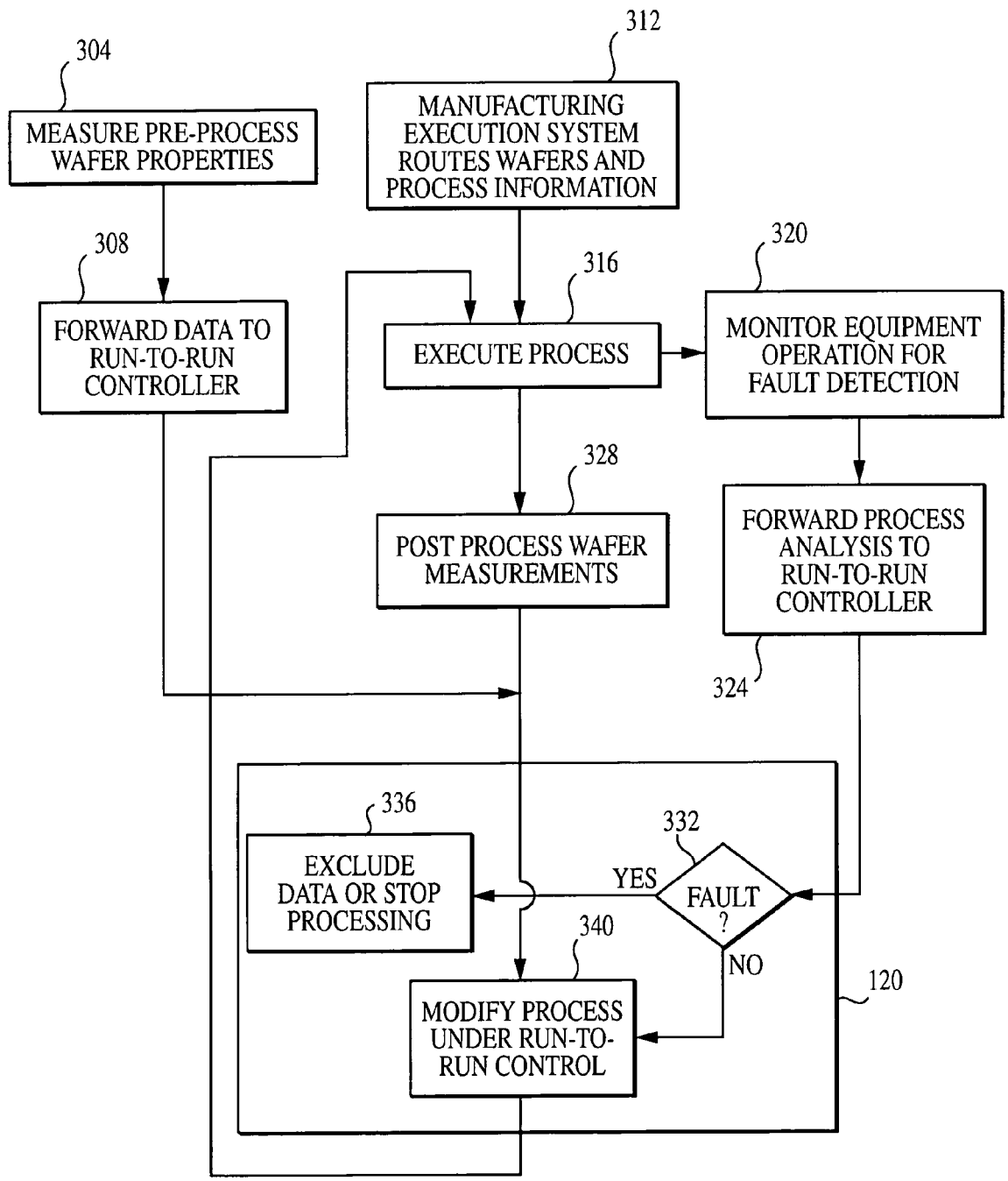
FIG. 3 depicts at least one example of a process implementable for controlling a manufacturing process of one or more embodiments of the present invention.

FIG. 3 depicts at least one example of a process implementable for controlling a manufacturing process of the present invention. Referring now to FIG. 3 (in conjunction with FIG. 1), in at least this embodiment, processing commences with the step of measuring wafer properties (STEP 304). Specifically, the pre process wafer properties may be measured prior to their arrival at the tool (e.g., one or more tools 150). As discussed above, any of post measurement sensors located at upstream tools, in situ sensors, integrated or inline sensors, or other analogous devices may be utilized.

Any number of wafer properties may be measured at this point, including, for example, film thickness, uniformity, critical dimensions, particle counts, etc. After measuring these wafer properties, the data is forwarded to run-to-run controller 120 (STEP 308).

In conjunction with the forwarding of the measured data to run-to-run controller 120, the corresponding wafer is delivered to one or more tools 150 with any associated process information (STEP 312). In addition, a manufacturing execution system (MES) transmits information relating to and identifying the particular recipe(s) to be utilized by the one or more tools 150 for processing the wafer. As known to those of ordinary skill in the art, the MES may identify the particular chambers to be used, any process sequences, routing information in the tool, settings, etc. Similarly, the MES is typically responsible for automating, integrating, and coordinating each of the processes and resources required to execute or produce an output product.

Subsequently, one or more tools 150 executes its manufacturing process (STEP 316). More particularly, one or more tools 150 processes the wafer in accordance with the information received from the MES in conjunction with any information provided by run-to-run controller 120 and/or fault detection system 110. As will be discussed below, the information received from run-to-run controller 120 may be used to modify or adjust the recipe provided by the MES in the absence of faults.

During execution of the process, as will be discussed below, fault detection system 110 monitors the tool for tool faults or tool failures and the wafers for wafer property failures (STEP 320). The analysis conducted by fault detection system or, in other words, whether a fault is detected, is forwarded to run-to-run controller 120 (STEP 324). For example, a fault detection index may be passed to controller 120 (from fault detection system 110) for identifying the presence or absence of a fault. In accordance with one or more embodiments of the present invention, this information is then used to determine those instances where a recipe should (and should not) be modified according to run-to-run techniques.

After the tool process has completed execution, the wafer is measured in a post process measurement step (STEP 328). In one or more embodiments of the present invention, the measurements may be made using an integrated sensor on the tool. Similarly, other types of sensors may also be used. This information is then utilized to modify subsequent recipes, as discussed herein.

In accordance with one or more embodiments of the present invention, and as mentioned above, run-to-run controller 120 modifies tool recipes using post process measurements in conjunction with fault detection information. Specifically, a determination is first made whether the process has experienced a tool or wafer property fault (STEP 332). For example, as will be discussed in greater detail below, a fault detection index (e.g., one or more numbers indicative of one or more conditions existing on a wafer and/or tool) generated by fault detection system 110 is compared with a range of acceptable values by, for example, run-to-run controller 120. If the index is not acceptable a fault has occurred. If a fault has occurred, the post process measurements collected from the run during which the tool fault occurred are not used for purposes of modifying subsequent recipes (STEP 336). Furthermore, processing may terminate altogether. On the other hand, if the process determines that a fault has not occurred, the recipe is modified under the run-to-run techniques of the present invention (STEP 340). In this manner, recipes are modified in those situations where a tool fault has not occurred.

Figure 4:
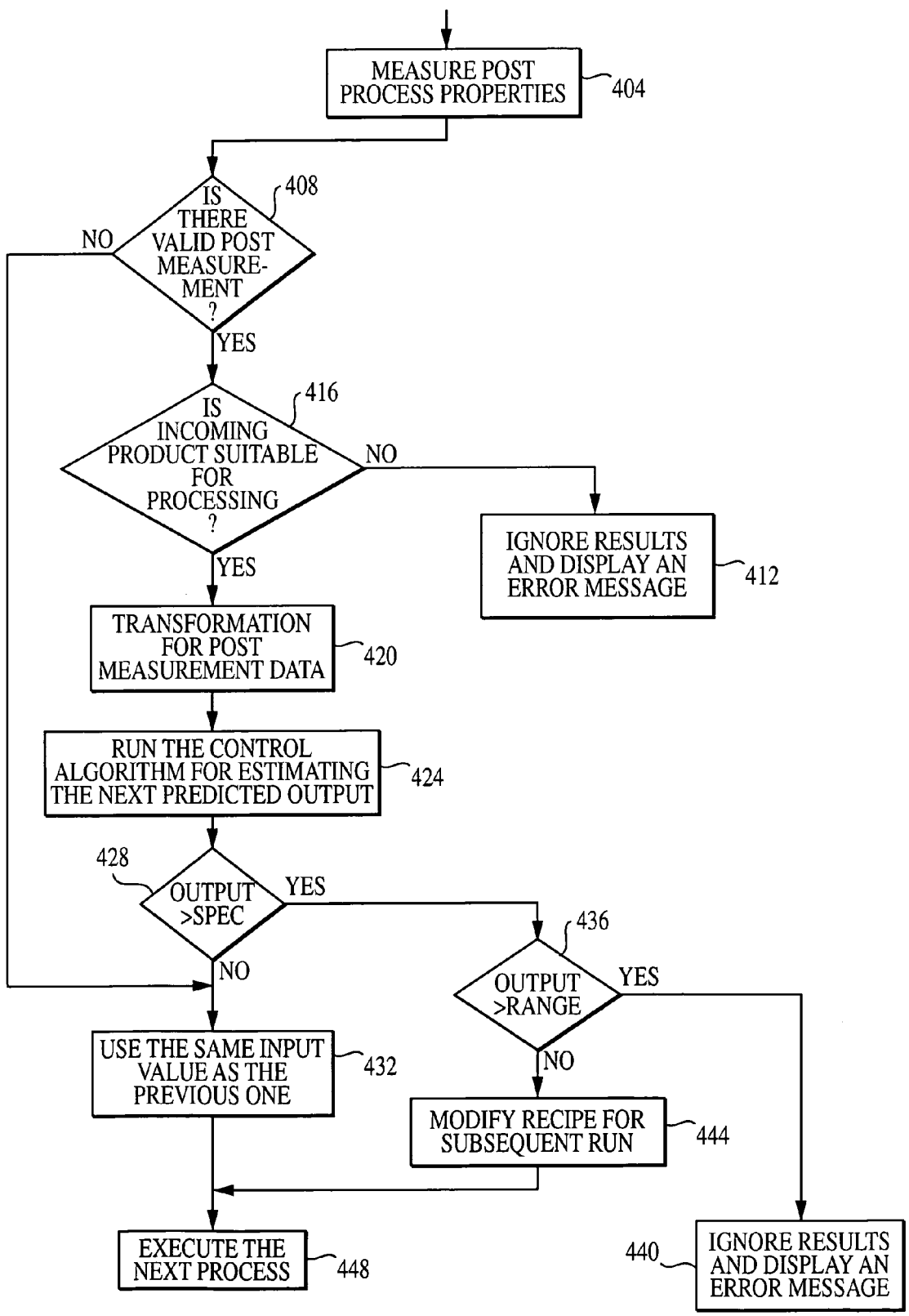
FIG. 4 depicts at least one example of a process utilizable for implementing a run-to-run control procedure of one or more embodiments of the present invention.

FIG. 4 depicts at least one example of a process utilizable for implementing a run-to-run control procedure according to one or more concepts of the present invention. Initially, post process wafer properties from a previous process or tool are measured and forwarded to a tool in which the run-to-run and fault detection techniques of the present invention are to be implemented (STEP 404). The measurements may be taken from the upstream tool or from a metrology tool positioned after the upstream process but before the instant tool. Similarly, the measurements may be taken at the instant tool itself, or at any other analogous device or location before processing.

In certain instances, the upstream measurements may not be valid. For example, it may be too time consuming to measure each wafer in some tools or processes. In these situations, each wafer or run may not be measured. For example, it may be possible that measurements are not performed on every second or third run. Post processing measurements from these wafers are therefore not valid or considered in the process. Thus, the upstream measurements are checked to determine whether they are valid measurements (STEP 408). If not, run-to-run controller 120 ignores the measured upstream measurements and continues processing using setpoints for previous runs (STEP 432). If valid, the measurements may be used in modifying the tool's processing recipe.

In accordance with at least some embodiments of the present invention, and as will be discussed in greater detail below, modifications to the recipe may be factored into a fault detection model as variables. In these embodiments, any recipe setpoint changes implemented by run-to-run controller 120 are forwarded to fault detection system 110, which in turn utilizes these recipe modifications to identify new fault condition ranges. In this manner, fault detection system 110 may operate in a sensitive manner (i.e., adjusting the range of fault conditions to comport with any modified recipe setpoints) even when recipe changes have been implemented by run-to-run controller 120.

It should be understood that the specific steps and sequence thereof of the embodiments heretofore described and depicted are by way of example, and that other additions, omissions and configurations are also contemplated by the present invention. For example, it is envisioned that all processing attributes received by the run-to-run controller first pass through (or originate with) the fault detection system. In such embodiments, if a fault is detected, then rather than receiving any processing attributes, the run-to-run controller might only receive, e.g., a fault alert.

In accordance with one or more aspects of the present invention, and as discussed above, runs or wafers processed by tools that have experienced a tool fault or that have experienced a wafer property failure are not considered in run-to-run processes for subsequent runs. Thus, fault detection information regarding the processing tool is considered before continuing (STEP 416). Specifically, if a failure or fault condition in a previous run is detected, the tool's recipe is not modified (STEP 412). Furthermore, an error message may be displayed, and processing may halt altogether.

If a fault was not detected in a previous run, any necessary transformations to the data are performed (STEP 420). For instance, the raw data read by the sensors may be converted to a more meaningful form. As one example, a uniformity parameter may require a ratio between a number of measurements. Thus, in this example, a ratio of each of the measurements is calculated. Similarly, an average of film thicknesses would require a transformation to average all of the measured thicknesses. Also, it is altogether possible that with certain measurements, no transformations are needed.

After performing any transformations (if necessary), a control process algorithm is executed for estimating the next predicted output (STEP 424). Generally speaking, the algorithm utilizes various modeling techniques, the tool recipe, and information relating to the incoming wafers and to previous process runs for establishing an output predicted to be produced by the tool. For example, by utilizing a model, a particular output film thickness may be predicted based on setpoints corresponding to parameters such as pressure, power, gas flow, etc.

Once the next outputs have been predicted by the control algorithm, the output is compared against specification limits (STEP 428). The specification limits indicate the acceptable limits of a wafer property. If the outputs are within the specification limits (i.e., if the predicted output is within an acceptable range), no modifications are needed and the same setpoints used in a previous run are again utilized (STEP 432). On the other hand, if the predicted output exceeds the specification limits, the predicted output is compared against the acceptable range of the tool (STEP 436). The range of the tool describes the attainable capabilities of the tool. If the predicted output cannot be brought within the specification limits because the tool range is insufficient, the desired results will therefore not be obtainable. In this case, the process ignores the results, displays an error message, and, for example, terminates processing (STEP 440).

If the predicted output is outside of the specification limits but within the tool range, a modification may be made to the tool recipe (STEP 444). In particular, one or more setpoints of the recipe are modified according to standard modeling techniques. In many cases, as known to those of ordinary skill in the art, these models are designed by process engineers and downloaded onto system 100 during an initialization phase of the facility. Once the adjustments required to obtain the desired product have been estimated, the process is executed (STEP 448). In this manner, in one or more embodiments of the present invention, the control algorithm utilizes one or more target wafer properties (i.e., desired outputs), measured incoming wafer properties, and modifications to a tool recipe as determined by run-to-run and fault detection techniques to efficiently produce semiconductor wafers.

Figure 5:
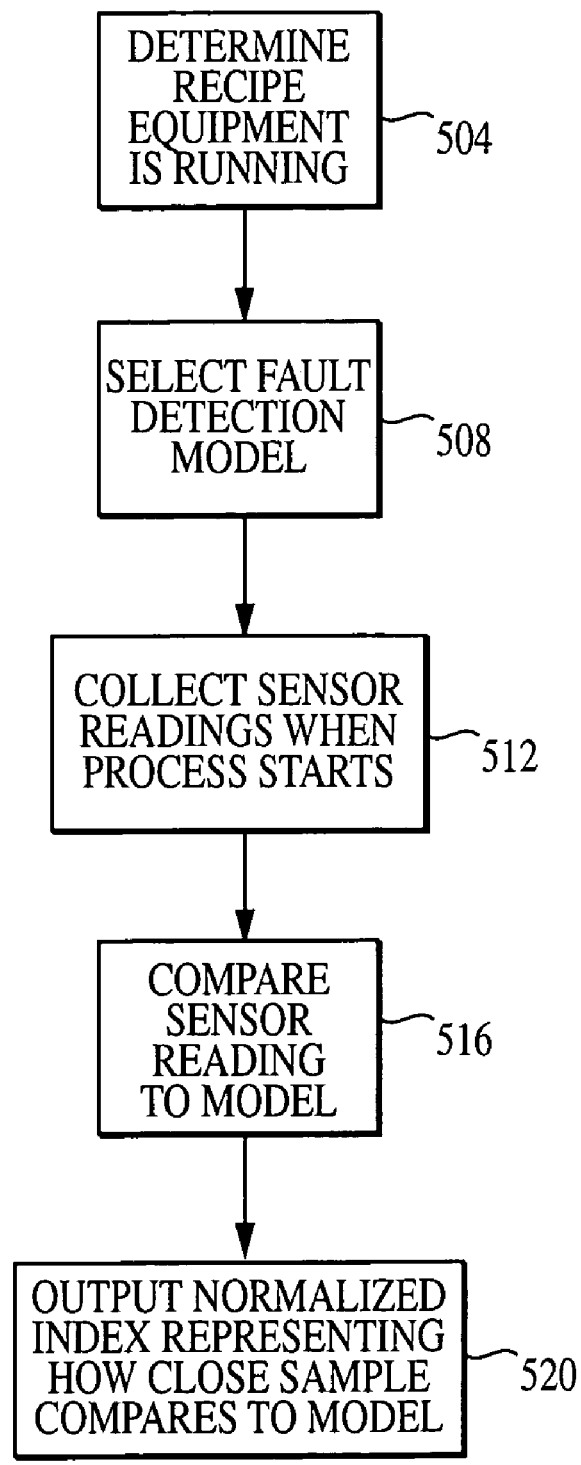
FIG. 5 depicts at least one example of a process utilizable for implementing a fault detection control procedure of one or more embodiments of the present invention.

FIG. 5 depicts at least one example of a process utilizable for implementing a fault detection control procedure according to one or more embodiments of the present invention. Initially, fault detection system 110 identifies the recipe implemented on a tool or process (STEP 504). In accordance with the recipe being utilized, a fault detection model is built or selected (STEP 508). As known to those of ordinary skill in the art, fault detection models may be used to define a range of conditions indicative of a fault condition. Thus, a model specifically associated with a recipe is utilized.

After selecting a fault detection model, the manufacturing process commences, during which sensors are utilized to collect wafer properties such as film thickness, uniformity, etc. in real time. Alternatively, the wafer properties may be collected before or after a process. These properties are compared against the fault detection model to produce a fault detection index or fault event (i.e., a trigger). As known to those of ordinary skill in the art, any number of methods may be used to generate the fault detection index. For example, any of statistical process control, neural network, or model based analysis techniques and the like may be utilized. The index represents the optimality of the wafers being produced by the tool. Thus, the index may be compared against a predetermined value to indicate a tool fault or tool failure. As discussed above, this index constitutes at least a portion of the wafer processing attributes used by the present invention in optimizing wafer production. For example, also as discussed above, run-to-run controller 120 may ignore measured wafer properties from runs produced by tools that have experienced a fault condition.

As mentioned briefly above, at least some embodiments of the present invention contemplate factoring modifications to the recipe made by run-to-run controller 120 into the fault detection model as independent parameters. In this manner, fault detection system 110 may be able to redefine a range of fault conditions to accommodate recipe changes to increase system sensitivity.

More specifically, fault condition boundaries may be redefined according to, and to account for, changes or modifications to recipe setpoints. In particular, by adjusting fault condition ranges according to recipe setpoint modifications, a narrower range of fault conditions may be implemented in the fault detection model. In at least some embodiments of the present invention, fault condition ranges may be set according to a fixed distance from a recipe setpoint. Thus, in these embodiments, a modification to a setpoint results in a corresponding modification to the fault condition range.

As an example, in a single dimensional case, a fixed recipe setpoint for obtaining a particular target property is set at an initial value (e.g., fifty units). According to the fault detection model associated with this recipe, fault conditions boundaries may be set initially at a given range (e.g., forty-eight and fifty-two units). Thus, actual wafer property measurements outside the given range (e.g., above fifty-two and below forty-eight units) result in a fault condition. Under these fault conditions, as discussed above, processing may, for example, terminate.

During processing, modifications to a recipe setpoint may be made by run-to-run controller 120 to address a process output drift. Thus, in the above example, run-to-run controller 120 may increase the recipe setpoint (e.g., from fifty to fifty-three units), thereby inadvertently resulting in a fault condition. To account for normal run-to-run modifications, one solution would be to increase the range of fault conditions (e.g., to forty-three and fifty-seven units). However, this solution desensitizes the fault detection capability. To alleviate this issue, embodiments of the present invention contemplate incorporating the modified setpoints into the fault detection models to generate fault condition boundaries based on a distance from the setpoint. In this manner, system sensitivity is not compromised by integrating run-to-run techniques with fault detection concepts. Thus, in this example, the range of fault conditions would be reset at fifty one to fifty one to fifty five.

Multi-dimensional scenarios of integration are similar. In these cases, the non-fault condition regions may be viewed as a distance from the coordinates of the multi-dimensional setpoint. When one or more of the coordinates defining the setpoint in a recipe is modified by run-to-run controller 120, the range of fault condition boundaries may be redefined as a function of the manipulated recipe parameters.

Additionally, in at least some embodiments of multiple input, multiple output scenarios, a distance between a predicted output value and an actual measured output value may be used as a metric for fault detection. Thus, the difference between the predicted and actual values may be used to determine the fault condition boundaries.

Figure 6:
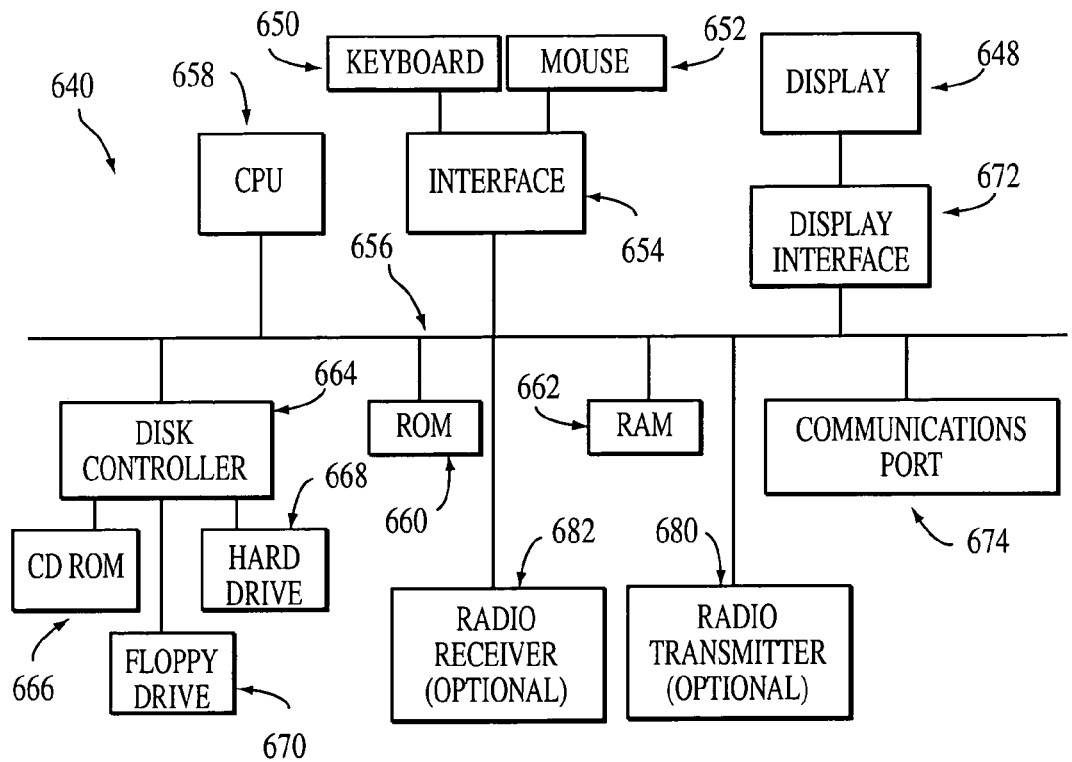
FIG. 6 is a high-level block diagram depicting aspects of computing devices contemplated as part of and for use with one or more embodiments of the present invention.

FIG. 6 illustrates a block diagram of one example of the internal hardware of potentially any of the components of system 100 of FIG. 2, examples of which include any of a number of different types of computers such as those having Pentium™ based processors as manufactured by Intel Corporation of Santa Clara, Calif. A bus 656 serves as the main information link interconnecting the other components of system 100. CPU 658 is the central processing unit of the system, performing calculations and logic operations required to execute the processes of the instant invention as well as other programs. Read only memory (ROM) 660 and random access memory (RAM) 662 constitute the main memory of the system. Disk controller 664 interfaces one or more disk drives to the system bus 656. These disk drives are, for example, floppy disk drives 670, or CD ROM or DVD (digital video disks) drives 666, or internal or external hard drives 668. CPU 658 can be any number of different types of processors, including those manufactured by Intel Corporation or Motorola of Schaumberg, Ill. The memory/storage devices can be any number of different types of memory devices such as DRAM and SRAM as well as various types of storage devices, including magnetic and optical media. Furthermore, the memory/storage devices can also take the form of a transmission.

A display interface 672 interfaces display 648 and permits information from the bus 656 to be displayed on display 648. Display 648 is also an optional accessory. Communications with external devices such as the other components of the system described above, occur utilizing, for example, communication port 674. For example, port 674 may be interfaced with a bus/network linked to metrology tools 190. Optical fibers and/or electrical cables and/or conductors and/or optical communication (e.g., infrared, and the like) and/or wireless communication (e.g., radio frequency (RF), and the like) can be used as the transport medium between the external devices and communication port 674. Peripheral interface 654 interfaces the keyboard 650 and mouse 652, permitting input data to be transmitted to bus 656. In addition to these components, the control system also optionally includes an infrared transmitter 678 and/or infrared receiver 676. Infrared transmitters are optionally utilized when the computer system is used in conjunction with one or more of the processing components/stations that transmits/receives data via infrared signal transmission. Instead of utilizing an infrared transmitter or infrared receiver, the control system may also optionally use a low power radio transmitter 680 and/or a low power radio receiver 682. The low power radio transmitter transmits the signal for reception by components of the production process, and receives signals from the components via the low power radio receiver.

Figure 7:
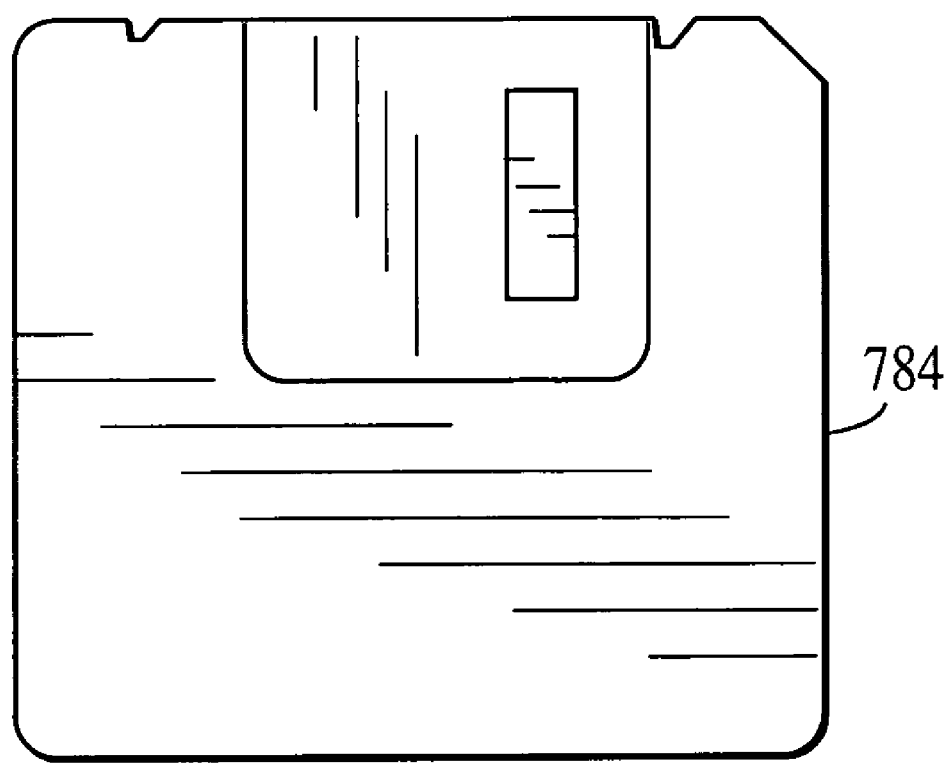
FIG. 7 illustrates one example of a memory medium which may be used for storing a computer implemented process of one or more embodiments of the present invention.

FIG. 7 is an illustration of an exemplary computer readable memory medium 784 utilizable for storing computer readable code or instructions including the model(s), recipe(s), etc). As one example, medium 784 may be used with disk drives illustrated in FIG. 6. Typically, memory media such as floppy disks, or a CD ROM, or a digital video disk will contain, for example, a multi-byte locale for a single byte language and the program information for controlling the above system to enable the computer to perform the functions described herein. Alternatively, ROM 660 and/or RAM 662 can also be used to store the program information that is used to instruct the central processing unit 658 to perform the operations associated with the instant processes. Other examples of suitable computer readable media for storing information include magnetic, electronic, or optical (including holographic) storage, some combination thereof, etc. In addition, at least some embodiments of the present invention contemplate that the computer readable medium can be a transmission.

Embodiments of the present invention contemplate that various portions of software for implementing the various aspects of the present invention as previously described can reside in the memory/storage devices.

In general, it should be emphasized that the various components of embodiments of the present invention can be implemented in hardware, software, or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using BASIC, C, C++ or other programming or scripting languages (e.g., TCL, Pearl, Java or SQL.

It is also to be appreciated and understood that the specific embodiments of the invention described hereinbefore are merely illustrative of the general principles of the invention. Various modifications may be made by those skilled in the art consistent with the principles set forth hereinbefore.

We claim:

1. A method for processing wafers in a manufacturing execution system using a run-to-run controller with a fault detection system, said method comprising:
   1) receiving, into said run-to-run controller, a recipe for controlling a tool, wherein said recipe includes at least one setpoint for obtaining one or more target wafer properties;
   2) monitoring processing of said wafers by measuring processing attributes including wafer properties and fault conditions identified by said fault detection system;
   3) forwarding said processing attributes to said run-to-run controller;
   4) modifying said at least one setpoint of said recipe at said run-to-run controller according to said measured processing attributes to maintain said target wafer properties, except when a fault condition is detected by said fault detection system in which case the at least one setpoint of said recipe is not modified according to said measured processing attributes; and
   5) incorporating said modified setpoint of said recipe as a parameter in said fault detection system.

2. The method of claim 1, further comprising measuring wafer properties before execution of processing.

3. The method of claim 1, further comprising generating a fault detection index from said measured processing attributes, and forwarding said index to said run-to-run controller for purposes of modifying said at least one setpoint.

4. The method of claim 1, wherein said modifying comprises comparing a predicted output against an acceptable tool specification limit.

5. The method of claim 1, wherein said modifying comprises comparing a predicted output against an acceptable tool range.

6. The method of claim 1, further comprising terminating said processing upon detection of a fault condition.

7. The method of claim 1, wherein said at least one setpoint comprises two or more setpoints.

8. The method of claim 1, wherein said at least one setpoint comprises at least one of temperature, pressure, power, processing time, lift position and flow rate of a material.

9. The method of claim 1, wherein said fault condition comprises a tool fault.

10. The method of claim 1, wherein said fault condition comprises a wafer property fault.

11. The method of claim 1, wherein incorporating said modified setpoint comprises incorporating said at least one setpoint of said recipe in one or more fault detection models used to define a range of conditions indicative of a fault condition.

12. The method of claim 1, wherein said measured wafer properties are not used to modify said recipe when a wafer fault is detected.

13. A method for processing wafers, said method comprising:
1) processing said wafers according to a recipe, wherein said recipe includes at least one setpoint for obtaining one or more target wafer properties;
2) measuring wafer properties;
3) detecting conditions indicative of a fault condition using a fault detection system;
4) modifying said at least one setpoint of said recipe according to said measured wafer properties to maintain said target wafer properties in the absence of a fault condition, and not modifying said at least one setpoint of said recipe according to said measured wafer properties in the presence of a fault condition; and
5) incorporating said modified setpoint of said recipe as a parameter in said fault detection system.

14. The method of claim 13, wherein processing is terminated if a fault condition is detected.

15. The method of claim 13, wherein said measuring occurs during processing.

16. The method of claim 13, wherein said measuring occurs after processing.

17. The method of claim 13, wherein said at least one setpoint of said recipe is incorporated as a parameter into fault detection models used to define a range of conditions indicative of a fault condition.

18. A system for processing wafers in a manufacturing execution system, said system comprising
a run-to-run controller for controlling a tool according to a recipe received from said manufacturing execution system, wherein said recipe includes at least one setpoint for obtaining one or more target wafer properties;
a sensor for measuring processing attributes including wafer properties;
a fault detector for monitoring said wafer properties to detect conditions indicative of a fault condition and forwarding said conditions to said run-to-run controller;
wherein said at least one setpoint of said recipe is modified according to said processing attributes to maintain said target wafer properties, except when a fault condition is detected by said fault detector in which case the at least one setpoint is not modified according to said processing attributes; and
wherein said modified setpoint of said recipe is incorporated as a parameter in said fault detector.

19. The system of claim 18, further comprising a sensor for measuring wafer properties before execution of processing.

20. The system of claim 18, wherein said fault detector generates a fault detection index from said measured processing attributes, and forwards said index to said run-to-run controller for purposes of modifying said at least one setpoint.

21. The system of claim 18, wherein said run-to-run controller modifies said at least one setpoint by comparing a predicted output against an acceptable tool specification limit.

22. The system of claim 18, wherein said run-to-run controller modifies said at least one setpoint by comparing a predicted output against an acceptable tool range.

23. The system of claim 18, wherein said run-to-run controller terminates processing upon detection of a fault condition.

24. The system of claim 18, wherein said at least one setpoint comprises two or more setpoints.

25. The system of claim 18, wherein said at least one setpoint comprises at least one of temperature, pressure, power, processing time, lift position and flow rate of a material.

26. The system of claim 18, wherein said fault condition comprises a tool fault.

27. The system of claim 18, wherein said fault condition comprises a wafer property fault.

28. The system of claim 18, wherein fault detection models used to define a range of conditions indicative of a fault condition, wherein said fault detection models are modified to incorporate, as parameters, said at least one setpoint of said recipe at said run-to-run controller.

29. A system for processing wafers in a manufacturing execution system using a run-to-run controller with a fault detection system, said system comprising:
means for receiving, into said run-to-run controller, a recipe for controlling a tool, wherein said recipe includes at least one setpoint for obtaining one or more target wafer properties;
means for monitoring processing of said wafers by measuring processing attributes including wafer properties and fault conditions identified by said fault detection system;
means for forwarding said processing attributes to said run-to-run controller; and
means for modifying said at least one setpoint of said recipe at said run-to-run controller according to said processing attributes to maintain said target wafer properties, except when a fault condition is detected by said fault detection system in which case the at least one setpoint of said recipe is not modified according to said processing attributes, said modified setpoint of said recipe being incorporated as a parameter in said fault detection system.

30. The system of claim 29, further comprising means for measuring wafer properties before execution of processing.

31. The system of claim 29, further comprising means for generating a fault detection index from said measured processing attributes, and means for forwarding said index to said run-to-run controller for purposes of modifying said setpoints.

32. The system of claim 29, wherein said means for modifying comprises means for comparing a predicted output against an acceptable tool specification limit.

33. The system of claim 29, wherein said means for modifying comprises means for comparing a predicted output against an acceptable tool range.

34. The system of claim 29, further comprising means for terminating said processing upon detection of a fault condition.

35. The system of claim 29, wherein said fault condition comprises a tool fault.

36. The system of claim 29, wherein said fault condition comprises a wafer property fault.

37. The system of claim 29, wherein fault detection models used to define a range of conditions indicative of a fault condition are modified to incorporate, as parameters, said at least one setpoint of said recipe at said run-to-run controller.

38. A system for processing wafers, said system comprising:
   means for processing said wafers according to a recipe, wherein said recipe includes at least one setpoint for obtaining one or more target wafer properties;
   means for measuring wafer properties;
   means for detecting conditions indicative of a fault condition; and
   means for modifying said at least one setpoint of said recipe according to said measured wafer properties to maintain said target wafer properties in the absence of a fault condition, and not modifying said at least one setpoint of said recipe according to said measured wafer properties in the presence of a fault condition, wherein said modified setpoint of said recipe is incorporated as a parameter in said means for detecting conditions indicative of a fault condition.

39. The system of claim 38, wherein processing is terminated if a fault condition is detected.

40. The system of claim 38, wherein fault detection models used to define a range of conditions indicative of a fault condition are modified to incorporate, as parameters, said at least one setpoint of said recipe at said run-to-run controller.

41. A computer program embodied on a computer-readable medium for processing wafers in a manufacturing execution system using a run-to-run controller with a fault detection system, said computer readable medium comprising:
   computer readable instructions for receiving, into said run-to-run controller, a recipe for controlling a tool, wherein said recipe includes at least one setpoint for obtaining one or more target wafer properties;
   computer readable instructions for monitoring processing of said wafers by measuring processing attributes including wafer properties and fault conditions identified by said fault detection system;
   computer readable instructions for forwarding said processing attributes to said run-to-run controller; and
   computer readable instructions for modifying said at least one setpoint of said recipe at said run-to-run controller according to said measured processing attributes to maintain said target wafer properties, except when a fault condition is detected by said fault detection system in which case the at least one setpoint of said recipe is not modified according to said measured processing attributes, wherein said modified setpoint is incorporated as a parameter in said fault detection system.

42. The computer-readable medium of claim 41, further comprising computer readable instructions for measuring wafer properties before execution of processing.

43. The computer-readable medium of claim 41, further comprising computer readable instructions for generating a fault detection index from said measured processing attributes, and computer readable instructions for forwarding said index to said run-to-run controller for purposes of modifying said setpoints.

44. The computer-readable medium of claim 41, wherein said computer readable instructions for modifying comprises computer readable instructions for comparing a predicted output against an acceptable tool specification limit.

45. The computer-readable medium of claim 41, wherein said computer readable instructions for modifying comprises computer readable instructions for comparing a predicted output against an acceptable tool range.

46. The computer-readable medium of claim 41, further comprising computer readable instructions for terminating said processing upon detection of a fault condition.

47. The computer-readable medium of claim 41, wherein said fault condition comprises a tool fault.

48. The computer-readable medium of claim 41, wherein said fault condition comprises a wafer property fault.

49. The computer-readable medium of claim 41, wherein fault detection models used to define a range of conditions indicative of a fault condition are modified to incorporate, as parameters, said at least one setpoint of said recipe at said run-to-run controller.

50. A computer program embodied on a computer-readable medium for processing wafers, said computer-readable medium comprising:
   computer readable instructions for processing said wafers according to a recipe, wherein said recipe includes at least one setpoint for obtaining one or more target wafer properties;
   computer readable instructions for measuring wafer properties;
   computer readable instructions for detecting conditions indicative of a fault condition; and
   computer readable instructions for modifying said at least one setpoint of said recipe according to said measured wafer properties to maintain said target wafer properties in the absence of a fault condition, and not modifying said at least one setpoint of said recipe according to said measured wafer properties in the presence of a fault condition, wherein said modified setpoint is incorporated as a parameter in a fault detection system.

51. The computer readable medium of claim 50, wherein processing is terminated if a fault condition is detected.

52. The computer-readable medium of claim 50, wherein fault detection models used to define a range of conditions indicative of a fault condition are modified to incorporate, as parameters, said at least one setpoint of said recipe.

53. A method for processing wafers in a manufacturing execution system using a run-to-run controller with a fault detection system, said method comprising:
   1) receiving, into said run-to-run controller, a recipe for controlling a tool, wherein said recipe includes at least one setpoint for obtaining one or more target wafer properties;
   2) monitoring processing of said wafers by measuring processing attributes including wafer properties and fault conditions identified by said fault detection system;
   3) forwarding said processing attributes to said run-to-run controller;
   4) modifying said at least one setpoint of said recipe at said run-to-run controller according to said measured processing attributes to maintain said target wafer properties when no fault condition is detected by said fault detection system; and
   5) refraining from modifying said at least one setpoint of said recipe at said run-to-run controller according to said measured processing attributes when a fault condition not requiring termination of said processing is detected by said fault detection system.

54. The method of claim 53, further comprising measuring wafer properties before execution of processing.

55. The method of claim 53, further comprising generating a fault detection index from said measured processing attributes, and forwarding said index to said run-to-run controller for purposes of modifying said at least one setpoint.

56. The method of claim 53, wherein said modifying comprises comparing a predicted output against an acceptable tool specification limit.

57. The method of claim 53, wherein said modifying comprises comparing a predicted output against an acceptable tool range.

58. The method of claim 53, further comprising terminating said processing upon detection of a fault condition.

59. The method of claim 53, wherein said at least one setpoint comprises two or more setpoints.

60. The method of claim 53, wherein said at least one setpoint comprises at least one of temperature, pressure, power, processing time, lift position and flow rate of a material.

61. The method of claim 53, wherein said fault condition comprises a tool fault.

62. The method of claim 53, wherein said fault condition comprises a wafer property fault.

63. The method of claim 53, wherein fault detection models used to define a range of conditions indicative of a fault condition are modified to incorporate, as parameters, said at least one setpoint of said recipe at said run-to-run controller.

64. The method of claim 53, wherein said measured wafer properties are not used to modify said recipe when a wafer fault is detected.

65. A system for processing wafers in a manufacturing execution system, said system comprising
a run-to-run controller for controlling a tool according to a recipe received from said manufacturing execution system, wherein said recipe includes at least one setpoint for obtaining one or more target wafer properties;
a sensor for measuring processing attributes including wafer properties;
a fault detector for monitoring said wafer properties to detect conditions indicative of a fault condition and forwarding said conditions to said run-to-run controller; and
wherein said at least one setpoint of said recipe is modified according to said processing attributes to maintain said target wafer properties when no fault condition is detected by said fault detector, and wherein said at least one setpoint of said recipe is refrained from being modified according to said measured processing attributes when a fault condition not requiring termination of said processing is detected by said fault detector.

66. The system of claim 65, further comprising a sensor for measuring wafer properties before execution of processing.

67. The system of claim 65, wherein said fault detector generates a fault detection index from said measured processing attributes, and forwards said index to said run-to-run controller for purposes of modifying said at least one setpoint.

68. The system of claim 65, wherein said run-to-run controller modifies said at least one setpoint by comparing a predicted output against an acceptable tool specification limit.

69. The system of claim 65, wherein said run-to-run controller modifies said at least one setpoint by comparing a predicted output against an acceptable tool range.

70. The system of claim 65, wherein said run-to-run controller terminates processing upon detection of a fault condition.

71. The system of claim 65, wherein said at least one setpoint comprises two or more setpoints.

72. The system of claim 65, wherein said at least one setpoint comprises at least one of temperature, pressure, power, processing time, lift position and flow rate of a material.

73. The system of claim 65, wherein said fault condition comprises a tool fault.

74. The system of claim 65, wherein said fault condition comprises a wafer property fault.

75. The system of claim 65, wherein fault detection models used to define a range of conditions indicative of a fault condition are modified to incorporate, as parameters, said at least one setpoint of said recipe at said run-to-run controller.

* * * * *